United States Patent
Manniche et al.

(10) Patent No.: US 9,611,978 B2
(45) Date of Patent: Apr. 4, 2017

(54) MAGNETIC MOUNT FOR SECURITY DEVICE

(71) Applicant: Greenwave Systems PTE LTD., Singapore (SG)

(72) Inventors: Martin Manniche, Laguna Hills, CA (US); Sonny Windstrup, Irvine, CA (US); Eric Scott Micko, Singapore (SG)

(73) Assignee: Greenwave Systems PTE LTD, Singapore (SG)

( * ) Notice: Subject to any disclaimer, the term of this patent is extended or adjusted under 35 U.S.C. 154(b) by 0 days.

(21) Appl. No.: 14/725,241

(22) Filed: May 29, 2015

(65) Prior Publication Data

US 2015/0345699 A1 Dec. 3, 2015

Related U.S. Application Data

(63) Continuation-in-part of application No. PCT/US2015/030692, filed on May 14, 2015, which
(Continued)

(51) Int. Cl.
*H05K 7/02* (2006.01)
*H05K 7/04* (2006.01)
(Continued)

(52) U.S. Cl.
CPC ........... *F16M 13/022* (2013.01); *F16B 2/005* (2013.01); *F16C 11/0604* (2013.01);
(Continued)

(58) Field of Classification Search
CPC .. A47G 1/17; G05G 1/14; H04N 8/18; H04N 5/225
(Continued)

(56) References Cited

U.S. PATENT DOCUMENTS 4,988,116 A * 1/1991 Evertsen ................ B60D 1/363
280/477
5,105,084 A 4/1992 Nagai et al.
(Continued)

FOREIGN PATENT DOCUMENTS

EP 2533026 A 12/2012
KR 1020100065897 A 6/2010
(Continued)

OTHER PUBLICATIONS

Korean Intellectual Property Office, International Search Report for PCT/US2015/030692, Aug. 26, 2015.
(Continued)

*Primary Examiner* — Hung S Bui
(74) *Attorney, Agent, or Firm* — Young's Patent Services; Bruce A. Young

(57) ABSTRACT

A security apparatus includes a body with a socket that includes a first magnetic material, and a mount with a stem that is formed to fit into the socket and includes a second magnetic material. If the stem is inserted into the socket, the body is held in place by magnetic attraction between the first magnetic material and the second magnetic material. The position of the stem in the socket determines an azimuth angle and an elevation angle for the body with respect to the mount. The first and second magnetic materials can be magnets or ferromagnetic materials, such as steel.

20 Claims, 12 Drawing Sheets

Related U.S. Application Data is a continuation-in-part of application No. 14/292,998, filed on Jun. 2, 2014, now Pat. No. 9,301,412.

(60) Provisional application No. 62/006,284, filed on Jun. 2, 2014.

(51) Int. Cl.
| | |
|---|---|
| *F16M 13/02* | (2006.01) |
| *F16B 2/00* | (2006.01) |
| *G03B 17/56* | (2006.01) |
| *G01D 11/30* | (2006.01) |
| *F16C 11/06* | (2006.01) |
| *F16B 1/00* | (2006.01) |

(52) U.S. Cl.
CPC .......... *F16C 11/0623* (2013.01); *G01D 11/30* (2013.01); *G03B 17/561* (2013.01); *F16B 2001/0035* (2013.01); *F16C 2226/18* (2013.01); *Y10T 29/49828* (2015.01)

(58) Field of Classification Search
USPC .......... 361/807, 809, 810; 248/346.5, 206.4, 248/678, 918
See application file for complete search history.

(56) References Cited

U.S. PATENT DOCUMENTS

| | | | |
|---|---|---|---|
| 5,461,231 A | 10/1995 | Sugimoto et al. | |
| 5,789,751 A | 8/1998 | Ma | |
| 5,923,250 A | 7/1999 | Pildner et al. | |
| 6,163,025 A | 12/2000 | Pantus | |
| 6,340,816 B1 | 1/2002 | Micko | |
| 6,350,076 B1 | 2/2002 | Wagner et al. | |
| 6,559,448 B1 | 5/2003 | Mueller et al. | |
| 6,879,240 B2 * | 4/2005 | Kruse | B60G 7/005 338/12 |
| 7,042,134 B2 | 5/2006 | Micko | |
| 7,075,431 B2 | 7/2006 | Buckley et al. | |
| 7,141,910 B2 | 11/2006 | Micko | |
| 7,183,912 B2 | 2/2007 | Micko | |
| 7,352,107 B2 | 4/2008 | Micko | |
| 7,399,969 B2 | 7/2008 | Micko | |
| 7,399,970 B2 | 7/2008 | Micko | |
| 7,498,576 B2 | 3/2009 | Micko | |
| 7,579,595 B2 | 8/2009 | Micko | |
| 7,622,845 B2 | 11/2009 | Micko | |
| 7,628,551 B2 | 12/2009 | Leyden et al. | |
| 7,686,287 B2 * | 3/2010 | Dixon | B23Q 1/32 269/20 |
| 7,710,337 B2 * | 5/2010 | Blalock | H01Q 1/125 310/90.5 |
| 7,755,052 B2 | 7/2010 | Micko | |
| 7,909,521 B2 | 3/2011 | Son | |
| 8,314,390 B2 | 11/2012 | Micko | |
| 8,354,643 B2 | 1/2013 | Micko | |
| 8,378,820 B2 | 2/2013 | Micko | |
| 8,414,201 B2 | 4/2013 | Skeoch et al. | |
| D742,770 S | 11/2015 | Windstrup et al. | |
| 9,188,487 B2 | 11/2015 | Zhevelev et al. | |
| 9,255,786 B2 | 2/2016 | Micko | |
| 9,301,412 B2 | 3/2016 | Micko et al. | |
| 9,304,044 B2 | 4/2016 | Micko | |
| 9,377,156 B2 * | 6/2016 | Wong | F16M 11/14 |
| 2004/0118985 A1 | 6/2004 | Omps | |
| 2004/0164647 A1 | 8/2004 | Micko | |
| 2004/0169145 A1 | 9/2004 | Micko | |
| 2005/0061979 A1 | 3/2005 | Narasako et al. | |
| 2005/0184869 A1 | 8/2005 | Micko | |
| 2005/0219046 A1 | 10/2005 | Noguchi | |
| 2005/0247845 A1 | 11/2005 | Li et al. | |
| 2006/0138329 A1 | 6/2006 | Wu et al. | |
| 2006/0254999 A1 | 11/2006 | Senften | |
| 2007/0030148 A1 | 2/2007 | Gabriel et al. | |
| 2007/0099469 A1 * | 5/2007 | Sorensen | A45F 5/02 439/289 |
| 2007/0114346 A1 | 5/2007 | Omps | |
| 2009/0065671 A1 | 3/2009 | Burgstaller | |
| 2009/0196597 A1 | 8/2009 | Messinger et al. | |
| 2009/0302220 A1 | 12/2009 | Micko | |
| 2015/0208826 A1 * | 7/2015 | Yang | E05B 73/0082 248/551 |
| 2015/0233702 A1 | 8/2015 | Micko | |
| 2015/0233765 A1 | 8/2015 | Micko | |
| 2016/0010972 A1 | 1/2016 | Micko | |

FOREIGN PATENT DOCUMENTS

| | | |
|---|---|---|
| KR | 1020100109125 A | 10/2010 |
| KR | 1020100116828 A | 11/2010 |

OTHER PUBLICATIONS

Korean Intellectual Property Office, Written Opinion of the International Searching Authority for PCT/US2015/030692, Aug. 26, 2015.
NETGEAR, VueZone Wireless Video Cameras: How it Works—Internet Web Page dated Oct. 6, 2012, retrieved from "https://web.archive.org/web/20111121082129/http://www.vuezone.com/learn-more/how-it-works" on Jun. 23, 2015.
USPTO, Notice of Allowance for U.S. Appl. No. 14/699,277, Aug. 18, 2015.
Unpublished Design U.S. Appl. No. 29/540,768, filed Sep. 28, 2015.
Unpublished Design U.S. Appl. No. 29/540,774, filed Sep. 28, 2015.
USPTO, Notice of Allowance for U.S. Appl. No. 14/292,998 Nov. 20, 2015.
Excelitas Technologies, DigiPyro(r) PYQ 2898 Application Note, 2011, retrieved from http://www.excelitas.com/downloads/app_digipyropyq2898_0208.pdf on Aug. 14, 2013.
Korean Intellectual Property Office, International Search Report for International Patent Application #PCT/US13/73799, Sep. 23, 2014.
Korean Intellectual Property Office, Written Opinion of the International Searching Authority for International Patent Application #PCT/US13/73799, Sep. 23, 2014.
Micko, Scott, Unpublished U.S. Appl. No. 14/699,184, filed Apr. 29, 2015.
Micko, Scott, Unpublished U.S. Appl. No. 14/699,277, filed Apr. 29, 2015.
Perkinelmer Optoelectronics, DigiPyro(r) Family PYD 1998, PYD 1988, PYD 1978 Application Note, 2008, retrieved from http://www.datasheetarchive.com/dl/Datasheets-UD4/DSAUD0062254.pdf on Sep. 10, 2013.
Windstrup et al., Unpublished Design U.S. Appl. No. 29/478,518, filed Jan. 6, 2014.
USPTO, non-final Office Action for U.S. Appl. No. 14/857,516, Apr. 8, 2016.

* cited by examiner

MAGNETIC MOUNT FOR SECURITY DEVICE

CROSS-REFERENCE TO RELATED APPLICATIONS

This application is a Continuation-in-Part of International Patent Application No. PCT/US15/030692, filed on May 15, 2015 and entitled "Mount for Security Device," the entire contents of which are incorporated by reference herein for any and all purposes, which is a Continuation-in-Part of U.S. patent application Ser. No. 14/292,998, filed on Jun. 2, 2014 and entitled "Dual Fixed Angle Mount for Security Device," the entire contents of which are hereby incorporated by reference herein for any and all purposes, and also claims the benefit of U.S. Provisional Patent Application No. 62/006,284, filed on Jun. 2, 2014 and entitled "Magnetic Mount for Security Device," the entire contents of which are hereby incorporated by reference herein for any and all purposes. This application is also related to International Patent Application No. PCT/US2013/073799, filed on Dec. 9, 2013 and entitled "Motion Detection," the entire contents of which are hereby incorporated by reference herein for any and all purposes.

BACKGROUND

Technical Field

The present subject matter relates to mounts for security devices. More specifically it relates to a mount that uses magnetic attraction to position a security device.

Background Art

Many types of security devices are in common use today. Examples of security devices include, but are not limited to, motion sensors such as infrared motion sensors and ultrasonic motion sensors, security cameras such as still image cameras, visible wavelength video cameras, and cameras sensitive to invisible wavelengths such as infrared or ultraviolet, light beam interruption sensors, chemical detectors such as smoke alarms, carbon dioxide detectors, and explosive gas detectors, sound detection devices such as glass breakage detectors or microphones, water sensors, and pressure sensors. Some security devices have specific mounting requirements and are mounted in a specific place and/or orientation to properly operate. Some security devices have a specific detection pattern or direction of sensitivity that is pointed in the proper direction to allow for detection of the threat from a specific location.

Some security devices are designed to be used with a particular mount. One type of mount that is commonly used is a tilt and swivel adapter that is attached to a standard electrical junction box and can be fixed in place by tightening a bolt or screw in the tilt and swivel adapter. Such a tilt and swivel mount allows the installer or user to change the azimuth and elevation of the security device to virtually any angle, providing a great deal of flexibility. Such a mount can be useful for some applications where a wide range of angles are needed for different installation situations.

Some security devices are designed to operate at a specific angle for their azimuth and/or elevation. In some cases, a specific mount is supplied with the security device to provide for the one specific angle. One example of this is a security device to be mounted on a ceiling and designed to point straight down, so the mount is designed to hold the security device in that position and is provided with the security device.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
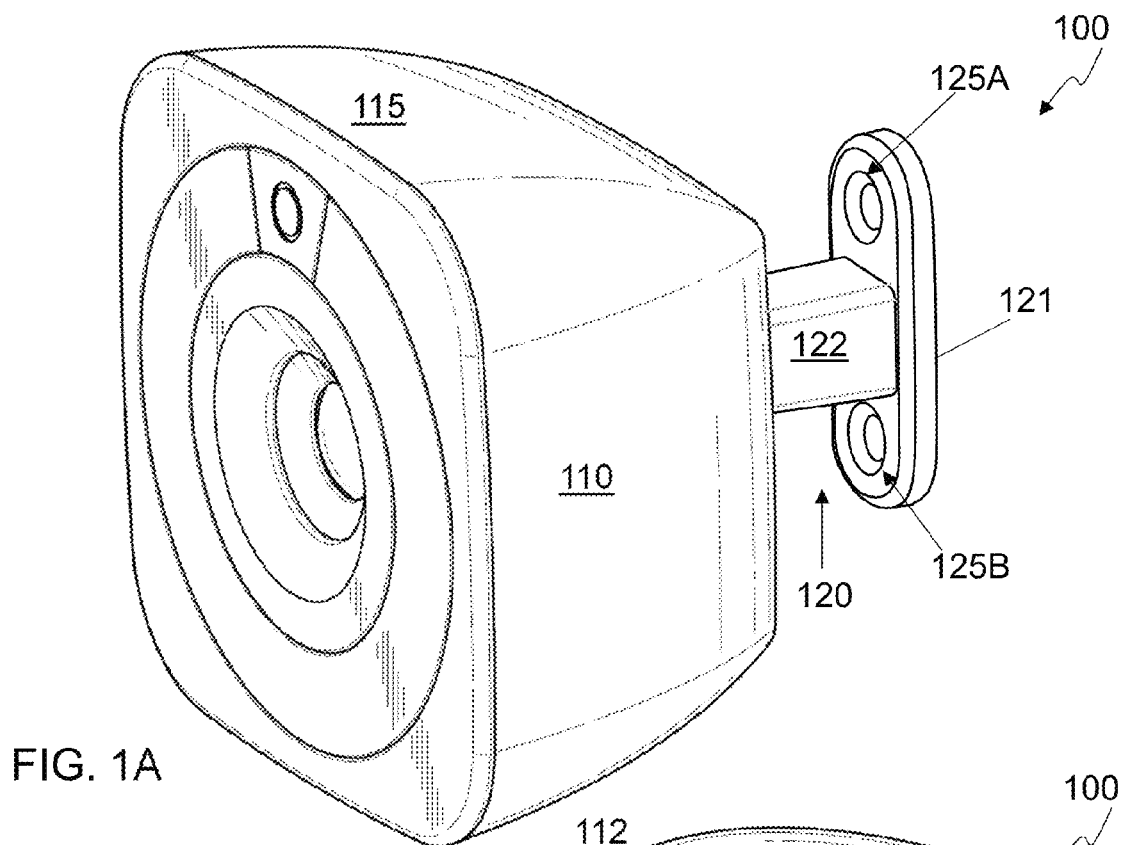
FIGS. 1A and 1B show oblique views from the front upper right and the rear lower left, respectively, of an embodiment of a camera having a camera body and a mount.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Magnetic material is a material that may be attracted to a magnet. Magnetic material may or may not remain magnetized without an external magnetic field. Examples of magnetic material include a magnet, steel, or other ferromagnetic materials.

A magnet is a magnetic material that generates a magnetic field, or is magnetized, even if the magnet is not being subjected to an external magnetic field. A magnet may also be referred to as a permanent magnet.

Ferromagnetic material, for the purposes of this disclosure, including the claims, refers to a magnetic material that does not generate a significant magnetic field of its own, or is not magnetized, without the presence of an external magnetic field. Ferromagnetic materials are attracted to a magnet. Ferromagnetic materials may include iron, nickel, cobalt, and many of their alloys, such as many steel alloys, as well as some compounds of rare earth metals. For the purposes of this disclosure, ferromagnetic materials include ferrimagnetic materials that are attracted to a magnet.

A security apparatus is an apparatus used for some type of security or monitoring application such as monitoring an area for some type of activity or event or providing an area with acoustical waves or electro-magnetic radiation such as radio waves, or light in the visible or invisible spectrum. Examples of a security apparatus include, but are not limited to, motion sensors such as infrared motion sensors and ultrasonic motion sensors, occupancy sensors, cameras such as still image cameras, visible wavelength video cameras, and cameras sensitive to invisible wavelengths such as infrared or ultraviolet, light beam interruption sensors, chemical detectors such as smoke alarms, carbon dioxide detectors, and explosive gas detectors, sound detection devices such as glass breakage detectors or microphones, water sensors, pressure sensors, speakers, ultrasonic transducers, infrared illumination sources, and visible light illumination sources. Some of the security apparatuses are omnidirectional, but some are directional. Some security devices have a specific detection pattern, direction of operation, or direction of sensitivity that is pointed in the proper direction to allow for detection of the threat from a specific location. This specific detection pattern can be referred to as the field of view for that security device, even if nothing is "viewed" per se, such as a microphone or an illumination source.

One example of an embodiment of a security apparatus is a video camera designed to be mounted on a wall and pointed at a specific area of interest. The video camera includes a camera body that has a field of view dependent upon the lens and image sensor used for the camera body, and a socket on the opposite side of the camera body from the lens. The socket has a concave spherical dome shape made of steel that has been snapped into a cavity on the back of the camera body.

The video camera also includes a mount that has a base designed to be attached to a wall with a stem extending from the base. The end of the stem is shaped to fit the shape of the concave spherical dome shape of the socket. The end of the stem has a surface area that is significantly smaller than the area of the socket so that the end of the stem can be positioned at many different places within the socket. The stem includes a magnet, such as a neodymium magnet, so that if the end of the stem is placed at a point in the socket, the end of the stem and the socket are magnetically attracted to one another.

A user or installer can attach the mount to the wall using screws or some other attachment mechanism. Then the camera body is positioned with its field of view aimed at the area of interest by positioning the end of the stem in the socket at the appropriate place to aim the camera body. Once the stem is inserted into the socket at the appropriate place, magnetic force holds the camera body in the desired orientation, that is with the desired elevation angle and azimuth angle, to monitor the area of interest. A high friction surface treatment may be applied to the end of the stem and/or the socket so that normal vibrations and shock from things such as slamming a door do not cause the orientation of the camera body to change.

Reference now is made in detail to the examples illustrated in the accompanying drawings and discussed below.

Figure 1B:
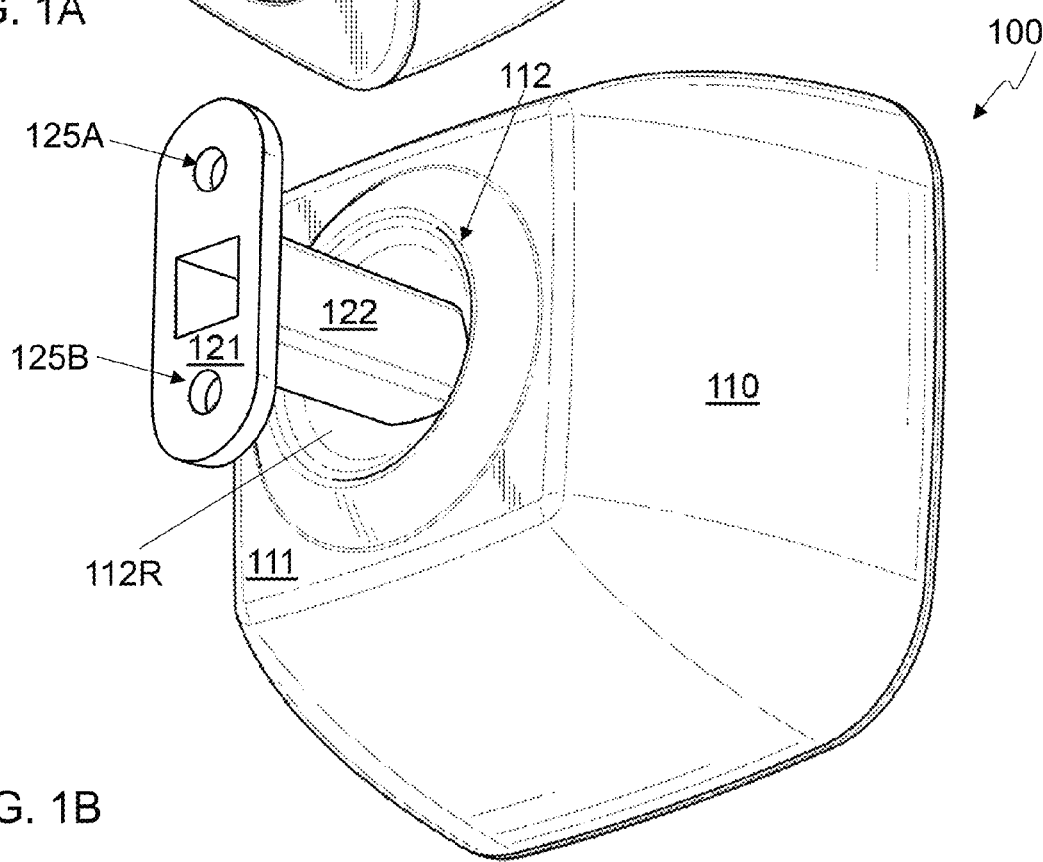

FIGS. 1A and 1B show oblique views from the front upper right and the rear lower left, respectively, of an embodiment of a camera 100 having a camera body 110 and a mount 120. The camera 100 may be considered a type of security apparatus and other types of security apparatuses may be similarly used with the mount 120. The mount 120 is separable from the camera body 110 and adapted to be affixed to a surface, such as a vertical wall, a ceiling, a flat surface, a pole, and/or a corner, depending on the embodiment. The camera body 110 may include a top side 115 which is positioned at the top of the camera body 110 when the camera body 110 is in an upright position and configured for normal functionality of the camera 100. The camera body 110 has a field of view extending from the camera body 110 defining the image capture area which may be any field of view depending on the lens, the image sensor, and the general configuration of the camera body 100. The field of view has a vertical viewing angle and a horizontal viewing angle, which are defined with the top side 115 of the camera body 110 oriented up. Either angle may be of any size with many embodiments having vertical and horizontal viewing angles ranging between about 10° and about 180°.

A centerline of the viewing angles may be defined as the direction that the camera 100 is pointed and may be used to calculate an elevation angle and an azimuth angle of the camera 100 in some embodiments. The elevation angle may be defined as the deviation of the direction of the camera 100 from horizontal. The azimuth angle may be defined as the angle that the camera 100 is pointed projected onto a horizontal plane. In some embodiments, the azimuth angle is considered to be 0° if the camera is pointed in a direction that is perpendicular to a vertical wall on which the mount 120 of the camera 100 is attached.

Figure 1C:
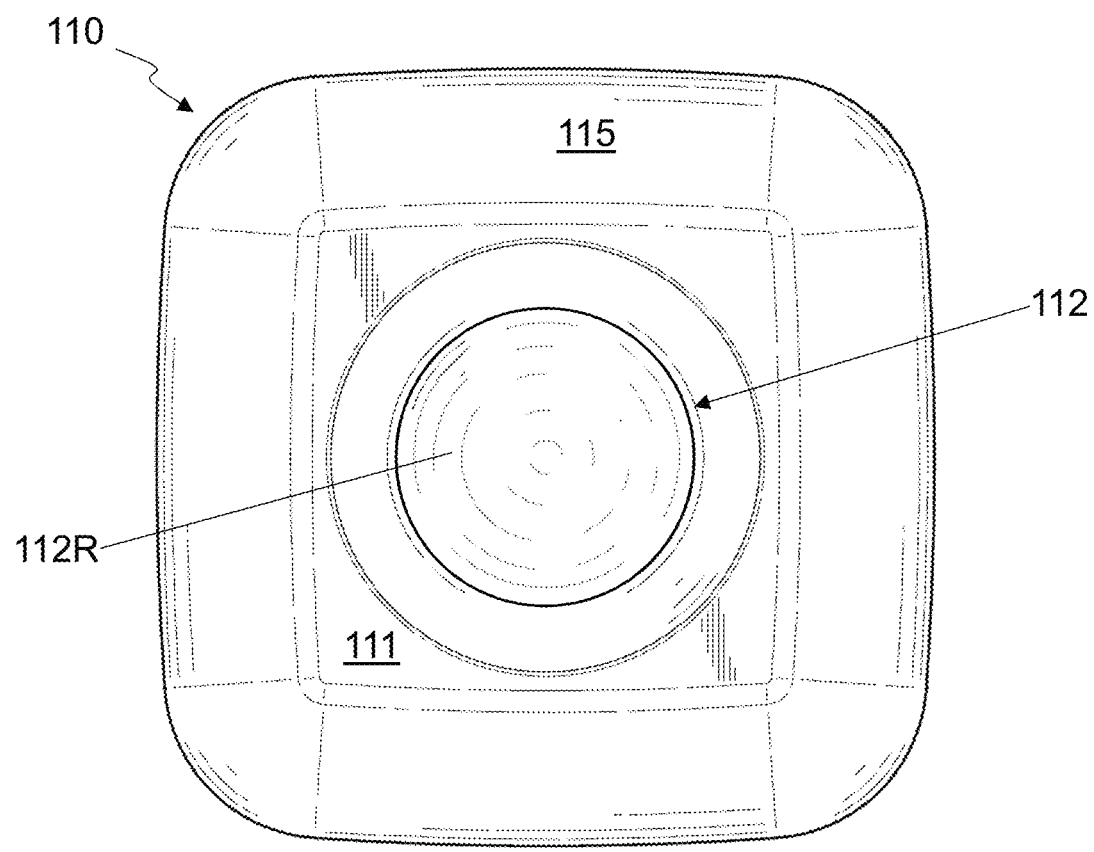
FIG. 1C shows a rear view of the embodiment of the camera body of FIG. 1A/B.

FIG. 1C shows a rear view of the embodiment of the camera body 110 of FIG. 1A/B. The camera body 110 includes a back side 111 that in some embodiments faces away from the field of view of the camera 100. A socket 112 may be recessed into the back side 111 of the camera body 110. The socket 112 includes as a concave curved surface 112R which includes a first magnetic material. In at least one embodiment, the first magnetic material, such as steel, is shaped to form the concave curved surface 112R and snapped into place in a cavity of the camera body 110 to form the socket 112. In some embodiments, the concave curved surface 112R of the socket 112 is shaped as a section of a sphere. While the socket 112 is shown on the back side 111 of the camera body 110, other types of security apparatuses may also include a similar socket positioned anywhere on that security apparatus.

Referring back to FIG. 1A/B, the mount 120 includes a base 121 and a stem 122 which may be separate pieces or may be formed together as a single article. The base 121 is designed to be attached to a surface, such as a vertical wall. Any type of attachment can be used, according to the embodiment, including, but not limited to, glue, nails, tape, double-sided adhesive pads, magnetic attraction, or screws. In the embodiment shown, a first screw hole 125A and a second screw hole 125B in the base 121 can be used with screws to affix the mount 120 to the surface. The stem 122 is attached to the base 121. The end of the stem 122 is formed to fit into the socket and includes a second magnetic material. In at least one embodiment, the second magnetic material includes a magnet. In at least one embodiment, the end of the stem 122 is a distal end, a proximal end of the stem 122 is attached to the base 121, and the stem 122 has four substantially flat sides tapered from the proximal end to the distal end.

The end of the stem 122 may be curved and may match the curve of the concave curved surface 112R of the socket 112. In at least some embodiments, the end of the stem is shaped as a section of a sphere with a diameter between about 100% and about 90% of the diameter of the spherical shape of the concave curved surface 112R of the socket 112. The end of the stem 122 has a surface area that in some embodiments is smaller than the surface area of the concave curved surface 112R of the socket 112. In some embodiments, the surface area of the end of the stem 122 is less than half of the surface area of the concave curved surface 112R of the socket 112. In at least one embodiment, the surface area of the end of the stem 122 is less than 25% of the surface area of the concave curved surface 112R of the socket 112 to allow for flexibility of positioning the end of the stem 122 in the socket 112 while still providing enough surface area contact to hold the camera body 110 in position.

Figure 2A:
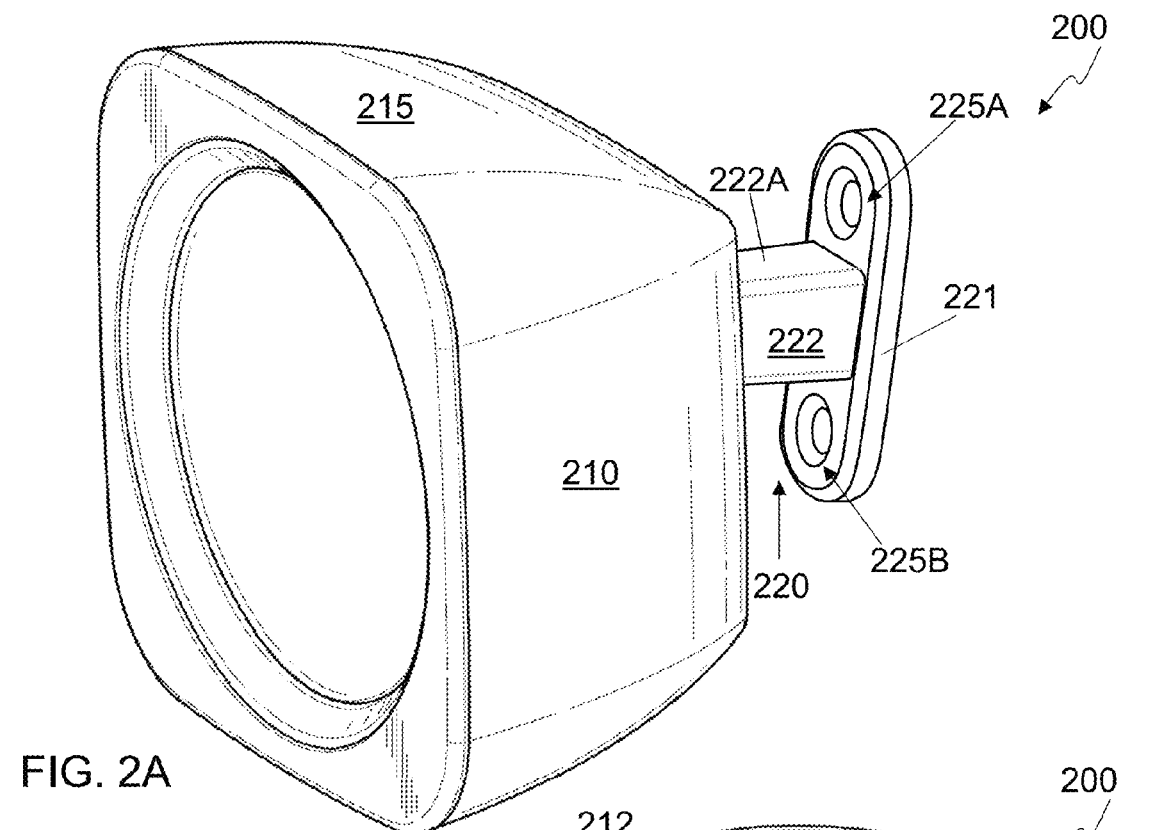
FIGS. 2A and 2B show oblique views from the front upper right and the rear lower left, respectively, of an embodiment of a motion sensor with a motion sensor body and a mount.

FIG. 1A and FIG. 1B show the camera body 110 in an upright position and the stem 122 of the mount 120 inserted into the socket 112 where it is held in place by magnetic attraction between the first magnetic material and the second magnetic material with both the azimuth angle and elevation angle at about 0° with respect to the mount 120. The stem 122, however, can be inserted into the socket 112 at different positions to set different orientations (azimuth/elevation angles) of the camera body 110. So the field of view of the camera body 110 is set to a first orientation if the stem 122 is inserted into the socket 122 at a first position, and the field of view of the camera body 110 is set to a second orientation if the stem 122 is inserted into the socket 112 at a second position. In at least one embodiment, the first orientation has a first azimuth angle and a first elevation angle, and the second orientation has a second azimuth angel and a second elevation angle. Where the movement of the stem 122 in the socket 112 can vary both the azimuth angle and the elevation angle, the movement of the resulting field of view can be said to have two degrees of freedom. Some embodiments may allow for additional degrees of freedom such as rotation of the field of view. Other embodiments may have only a single degree of freedom, such as to vary only the azimuth angle (as shown in FIG. 2A/B).

FIG. 1D-1G show side views of the embodiment of the camera 100 of FIG. 1A/B mounted on a vertical wall 102 and set to different elevation angles. The base 121 of the mount 120 is attached to the vertical wall 102 in all of FIG. 1D-1G. While four different elevation angles are shown, embodiments may allow for any number of elevation angles to be set for the field of view for the camera body 110 within any range, although in at least one embodiment, the elevation angles may range from about −45° to about 45°. In another embodiment, the elevation angles may range between from −30° to about 0°, and in yet another embodiment, the elevation angle may be fixed.

Figure 1D:
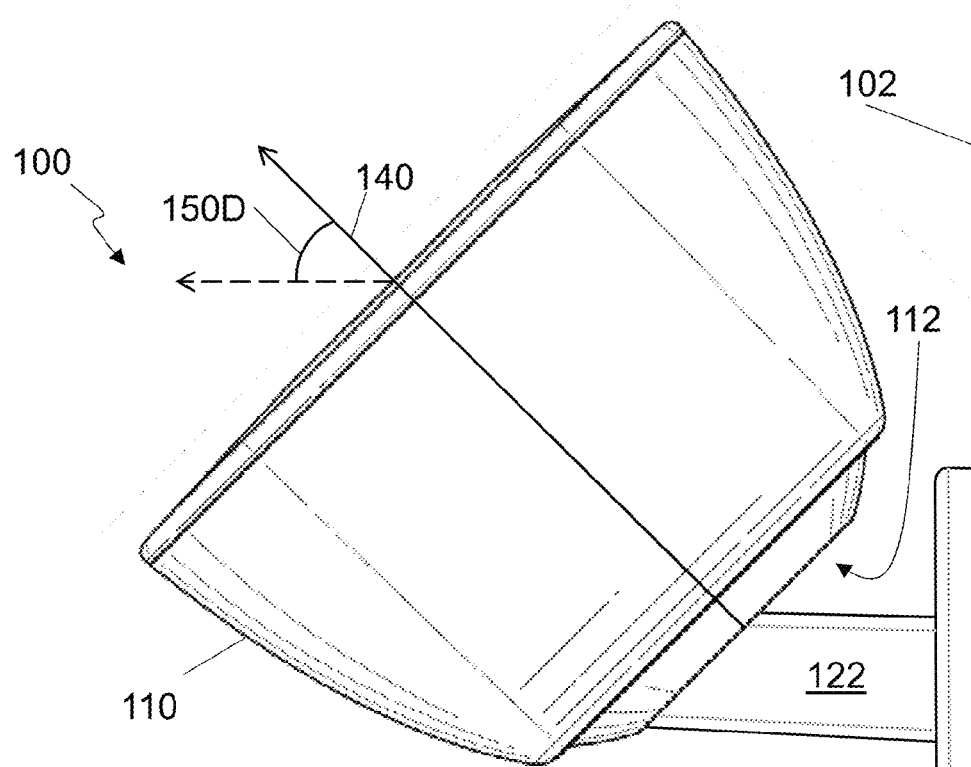
FIG. 1D-G show side views of the embodiment of the camera of 1A/B with the camera set to different elevation angles.

In FIG. 1D, the stem 122 of the mount 120 is inserted into the socket 112 at a first position. Because of the curved shape of the concave curved surface 112R of the socket 112, the camera body 110 is set to a first orientation, which in FIG. 1D has an elevation angle 150D of about 45° with the azimuth angle not shown in the side view. The elevation angle 150D in this embodiment is measured between the centerline 140 of the field of view of the camera body 110, and a horizontal plane as represented by the dashed line.

Figure 1E:
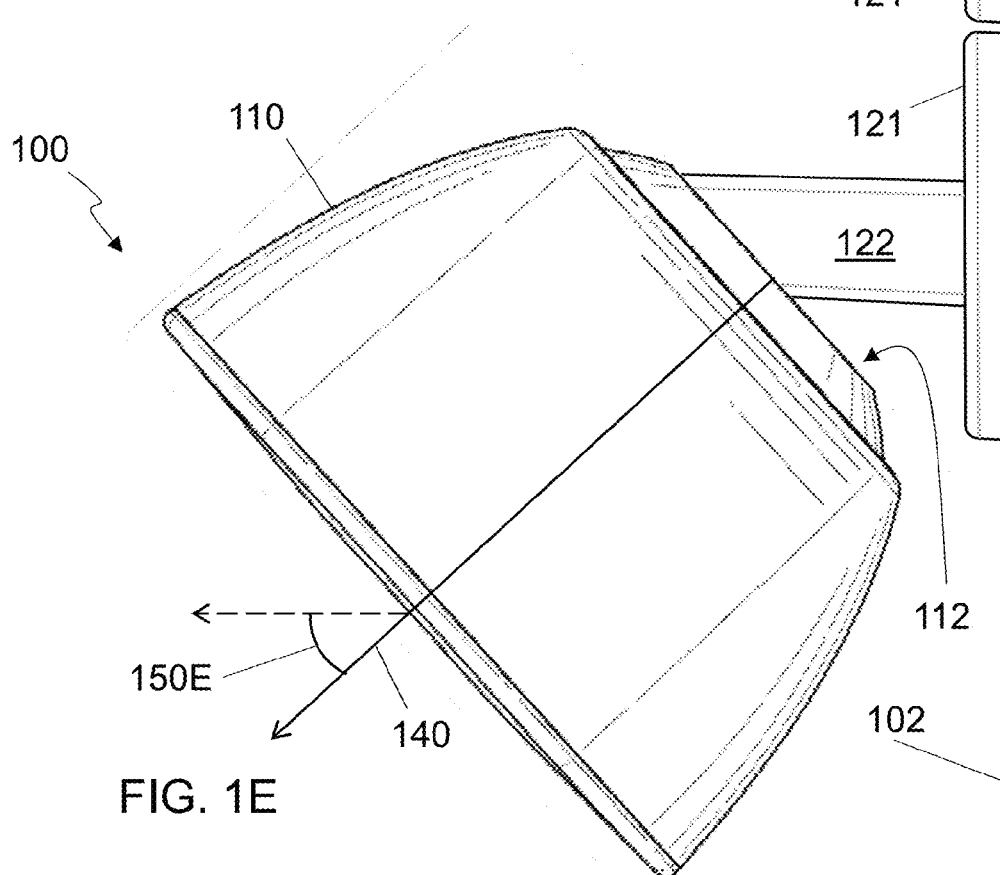

In FIG. 1E, the stem 122 of the mount 120 is inserted into the socket 112 at a second position. Because of the curved shape of the concave curved surface 112R of the socket 112, the camera body 110 is set to a second orientation, which in FIG. 1E has an elevation angle 150E of about −45° with the azimuth angle not shown in the side view. The elevation angle 150E in this embodiment is measured between the centerline 140 of the field of view of the camera body 110, and a horizontal plane as represented by the dashed line.

Figure 1F:
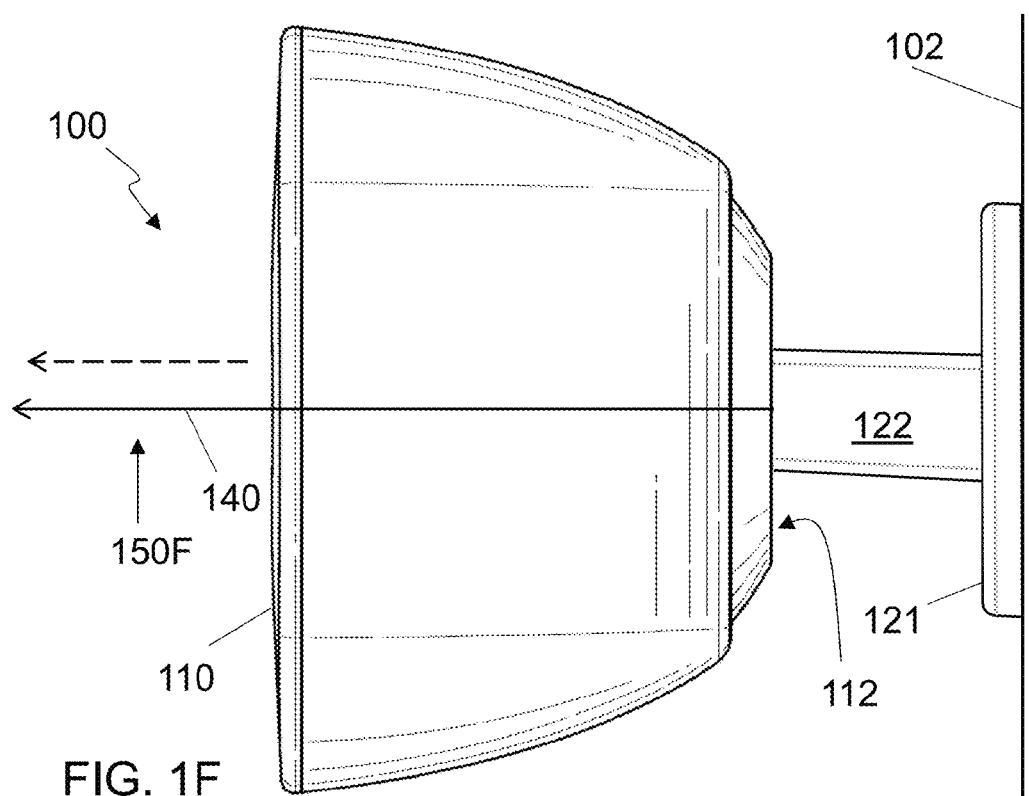

In FIG. 1F, the stem 122 of the mount 120 is inserted into the socket 112 at a third position. Because of the curved shape of the concave curved surface 112R of the socket 112, the camera body 110 is set to a third orientation, which in FIG. 1F has an elevation angle 150F of about 0° with the azimuth angle not shown in the side view. The elevation angle 150F in this embodiment is measured between the centerline 140 of the field of view of the camera body 110, and a horizontal plane as represented by the dashed line, which is parallel to the centerline 140 in the third orientation.

Figure 1G:
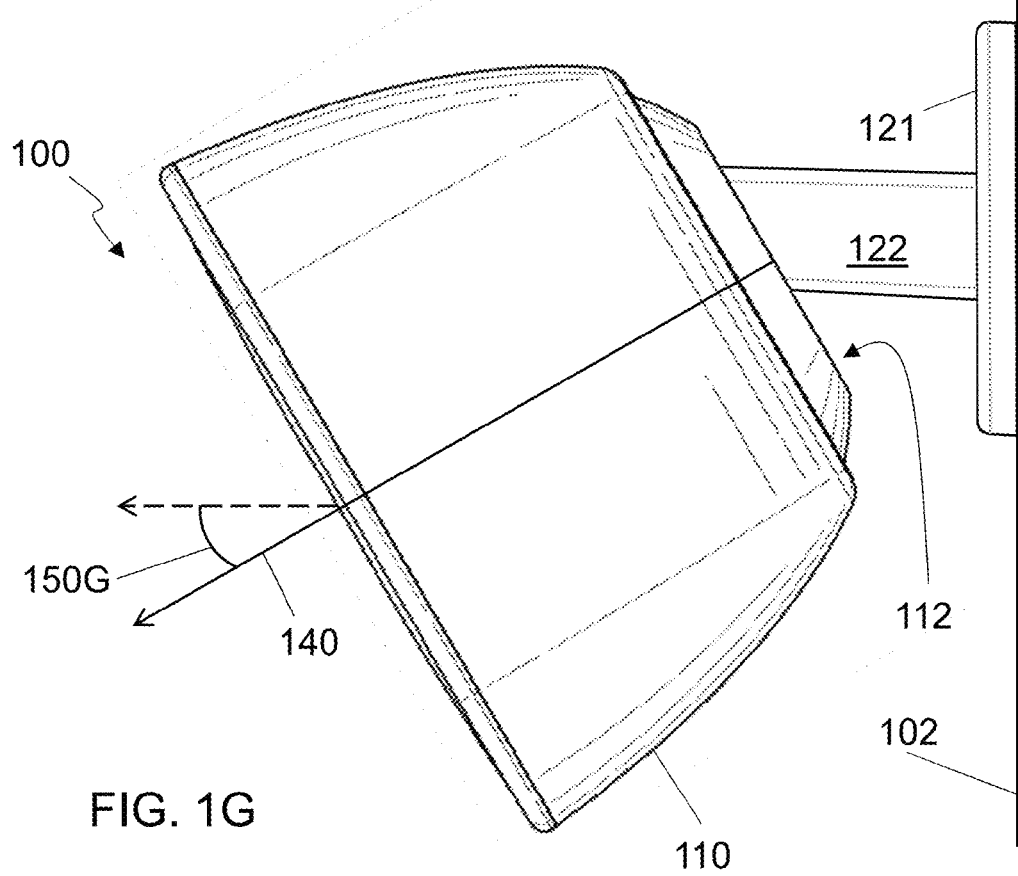

In FIG. 1G, the stem 122 of the mount 120 is inserted into the socket 112 at a fourth position. Because of the curved shape of the concave curved surface 112R of the socket 112, the camera body 110 is set to a fourth orientation, which in FIG. 1G has an elevation angle 150G of about −30° with the azimuth angle not shown in the side view. The elevation angle 150G in this embodiment is measured between the centerline 140 of the field of view of the camera body 110, and a horizontal plane as represented by the dashed line.

Figure 1H:
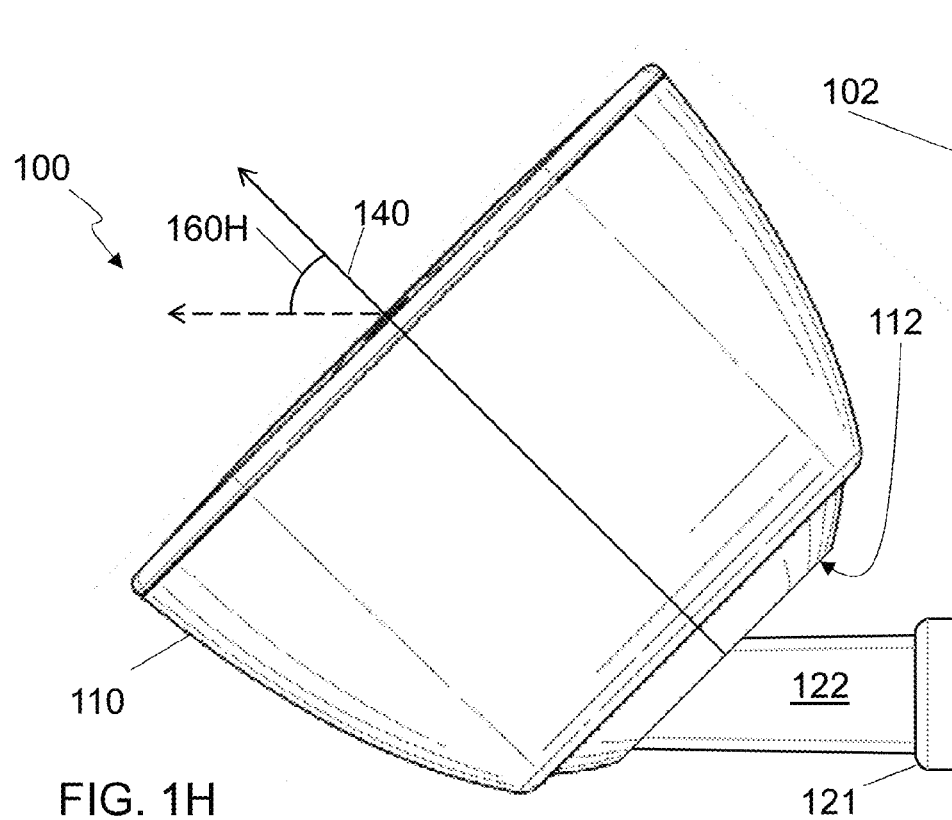
FIGS. 1H and 1J show top views of the embodiment of the camera of 1A/B with the camera set to different azimuth angles (FIG. 1I was skipped to avoid confusion)
Figure 1J:
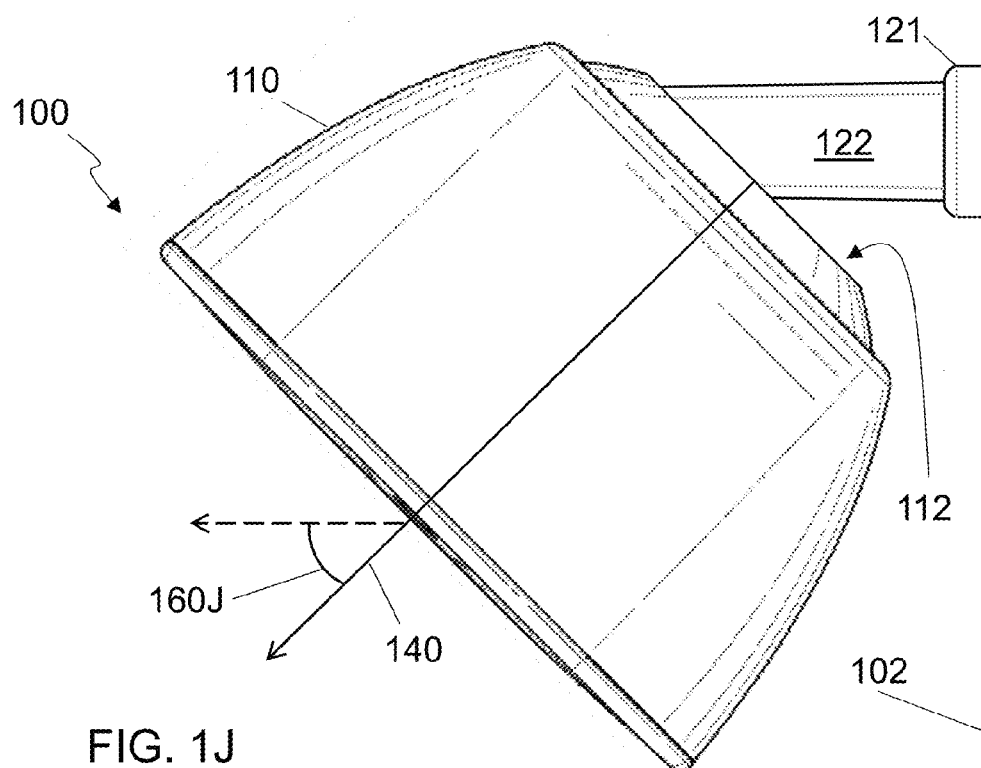

FIGS. 1H and 1J (no FIG. 1I was included to avoid confusion) show top views of the embodiment of the camera 100 of FIG. 1A/B mounted on a vertical wall 102 and set to different azimuth angles. The base 121 of the mount 120 is attached to the vertical wall 102 in both of FIGS. 1H and 1J. While two different azimuth angles are shown, embodiments may allow for any number of azimuth angles to be set for the field of view for the camera body 110 within any range, although in at least one embodiment, the azimuth angles may range between about −45° to about 45°, and in another embodiment, the azimuth angle may be fixed.

In FIG. 1H, the stem 122 of the mount 120 is inserted into the socket 112 at a fifth position. Because of the curved shape of the concave curved surface 112R of the socket 112, the camera body 110 is set to a fifth orientation, which in FIG. 1H has an azimuth angle 160H of about 45° with the elevation angle not shown in the top view. The azimuth angle 160H in this embodiment is measured between the centerline 140 of the field of view of the camera body 110, and a vertical plane perpendicular to the wall 102 as represented by the dashed line.

In FIG. 1J, the stem 122 of the mount 120 is inserted into the socket 112 at a sixth position. Because of the curved shape of the concave curved surface 112R of the socket 112, the camera body 110 is set to a sixth orientation, which in FIG. 1J has an azimuth angle 160J of about −45° with the elevation angle not shown in the top view. The azimuth angle 160J in this embodiment is measured between the centerline 140 of the field of view of the camera body 110, and a vertical plane perpendicular to the wall 102 as represented by the dashed line.

Due to the geometry of the socket 112 and stem 122, in at least some embodiments, the possible range of the azimuth angle may be dependent upon the elevation angle and/or the possible range of the elevation angle may be dependent upon the azimuth angle. In the embodiment shown, the socket 112 and stem 122 are configured to allow elevation and azimuth angles ranging from about −45° to about 45°. But as the absolute value of one of the angles increases, the possible range of the other angle decreases. So for example, if the azimuth angle is set to 45°, the elevation angle may not be variable at all and may be limited to about 0°. But if the azimuth angle is set to about 20°, the elevation angle may have a possible range that is less than the full range of −45° to 45°, but much greater than 0°, such as about −20° to about 20°, and if the azimuth angle is set to about 0°, the elevation angle may have its full range of about −45° to about 45°.

In embodiments, the camera body 110 is held in place by magnetic attraction between the first magnetic material and the second magnetic material when the stem 122 of the mount 120 inserted is into the socket 112. To help resist drift in the orientation of the camera body 110 due to vibrations, shocks, or casual contact with the camera body 110, some embodiments provide a high friction surface on at least one of the end of the stem 112 or the concave curved surface 112R of the socket 112. A high friction surface is any surface treatment that increases the coefficient of friction between two surfaces compared to the coefficient of friction between a smooth end of the stem 122 with nothing covering its raw material, and the concave curved surface 112 with a smooth surface and nothing covering its raw material. In at least some embodiments, the coefficient of friction is increased by at least 50% which are referred to as very high friction surface treatments. The high friction surface can be any type of treatment of the surface on the end of the stem 122 and/or the concave curved surface 112. In some embodiments, a texture is added to the surface of the raw material. The texture can be created in many different ways, depending on the embodiment and the type of material. Non-limiting examples of creating a texture include etching the surface of the material after it is formed, or, if the material is molded, texturing the mold used to form the stem 122 or the socket 112. In some embodiments, a high friction coating may be added to the end of the stem 122 and/or the concave curved surface 112R of the socket 112. An example of a high friction coating is a rubberized paint, In some embodiments, a textured coating, such as a texturized powder coat or a texturized paint, may be applied to create a high-friction surface. Some embodiments may use a combination of textured surface, high friction coating, and/or textured coating to create the high friction surface.

So in at least one embodiment, with the stem 122 of the mount 120 inserted into the socket 112 and held in place by magnetic attraction between the first magnetic material and the second magnetic material, the field of view of the camera body 110 is set to a first orientation if the stem 122 is inserted into the socket 112 at a first position, the field of view of the camera body 110 is set to a second orientation if the stem 122 is inserted into the socket 112 at a second position, and the field of view of the camera body 110 is set to a third orientation if the stem 122 is inserted into the socket 112 at a third position. In such an embodiment, the field of view of the camera body 110 varies with at least two degrees of freedom between the first orientation, the second orientation, and the third orientation.

Figure 2B:
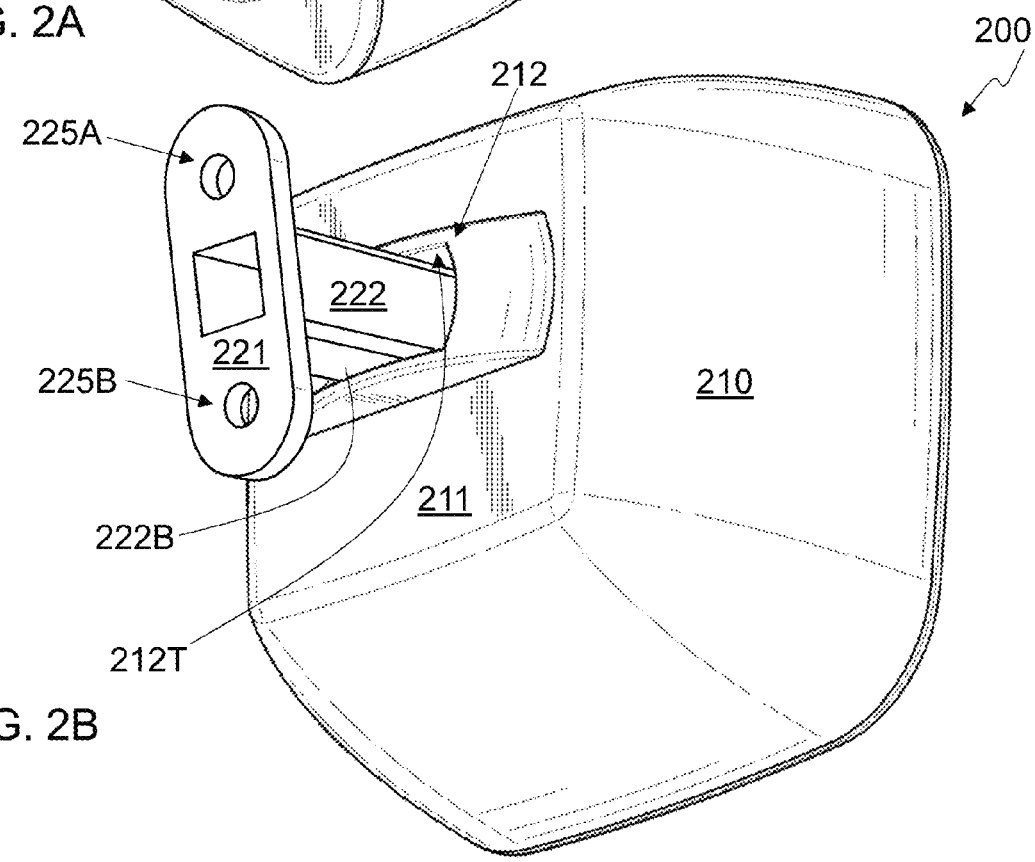
Figure 2C:
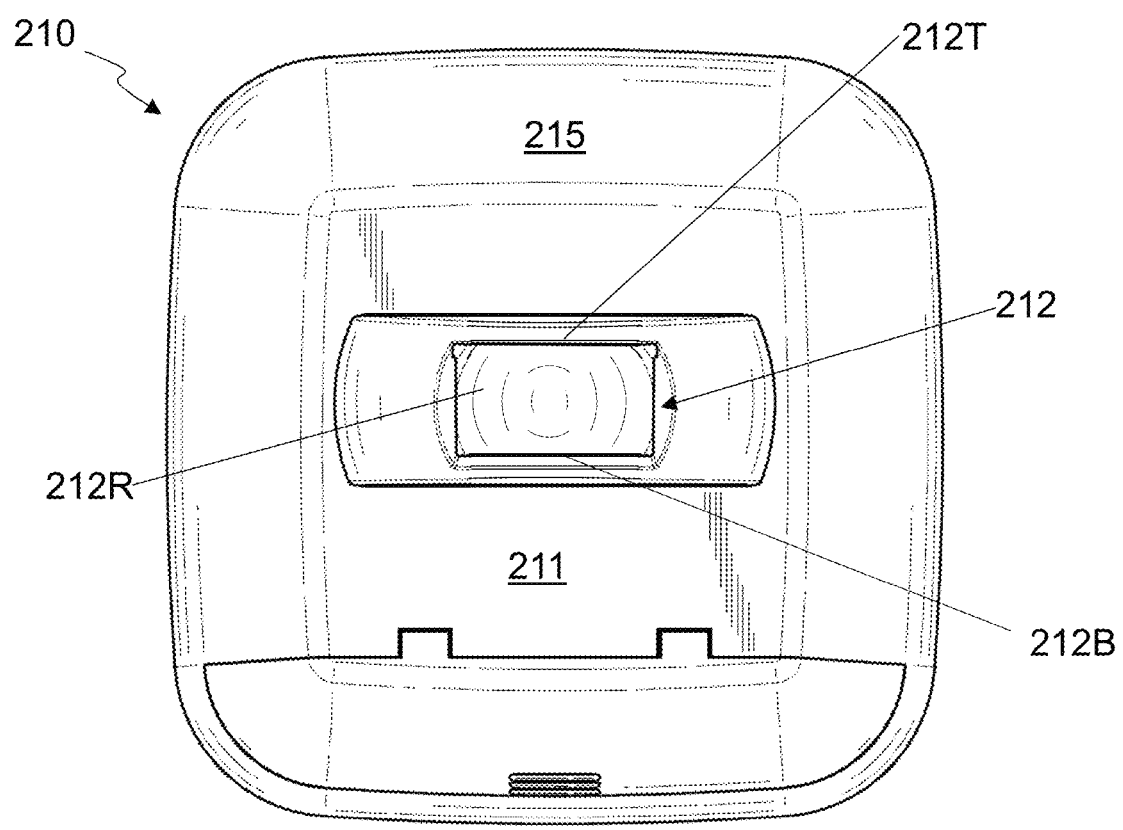
FIG. 2C shows a rear view of the embodiment of the motion sensor body of FIG. 2A/B.

FIGS. 2A and 2B show oblique views from the front upper right and the rear lower left, respectively, of an embodiment of a motion sensor 200 with a motion sensor body 210 and a mount 220. FIG. 2C shows a rear view of the same embodiment of the motion sensor body 210. The motion sensor 200 may be considered a type of security apparatus and other types of security apparatuses may be similarly used with the mount 220. The motion sensor 200 includes the motion sensor body 210 and the mount 220, which is separable from the motion sensor body 210. The motion sensor body 210 may include a top side 215 which is positioned at the top of the motion sensor body 210 when the motion sensor body 210 is in an upright position and configured for normal functionality of the motion sensor 200.

The motion sensor 200 has a detection pattern extending from the front of the motion sensor body 210. This detection pattern may also be referred to as the field of view of the motion sensor. The shape of the motion sensor pattern varies between embodiments, but in general is bounded on the top by a functionality plane of the motion sensor body which emanates from the front of the motion sensor body 210 at an elevation angle that typically is measured as some number of degrees from horizontal when the motion sensor body 210 is positioned with its top side 215 up.

The motion sensor body 210 also includes a back side 211 that faces away from the detection area of the motion sensor 200. A socket 212 is recessed into the back side 211 of the motion sensor body 210. The socket 212 includes a top wall 212T and a bottom wall which are substantially flat, as well as a rear-facing surface 212R which may be curved and may include a magnetic material. Other types of security apparatuses may include a similar socket to the socket 212.

The mount 220 includes a base 221 and a stem 222 which may be separate pieces or may be formed together as a single article. The base 221 is designed to be attached to a vertical wall. Any type of attachment can be used, according to the embodiment, including, but not limited to, glue, nails, tape, double-sided adhesive pads, magnetic attraction, or screws. In the embodiment shown, a first screw hole 225A and a second screw hole 225B in the base 221 can be used with screws to affix the mount 220 to the vertical wall. A proximal end of the stem 222 is attached to the base 221, and a distal end of the stem 222 is formed to fit into the socket 212 with the first side 222A and second side 222B in close proximity to the top wall 212T and bottom wall 212B of the socket 212 respectively. The distal end of the stem 222 includes a magnetic material positioned near the distal end of the stem 222.

FIG. 2A and FIG. 2B show the motion sensor body 210 in an upright position and the stem 222 of the mount 220 inserted into the socket 212 where it may be held in place by magnetic attraction between the first magnetic material and the second magnetic material. The elevation angle of the motion sensor body 210 is fixed with respect to the stem 222 in this embodiment.

FIG. 2C shows a rear view of the embodiment of the motion sensor body 210. The motion sensor body 210 has a top side 215 and a back side 211 with the socket 212 recessed into the back side 211. The socket 212 includes a curved rear-facing surface 212R between the top wall 212T and the bottom wall 212B, that in some embodiments includes a magnetic material, such as steel. In at least one embodiment, the steel magnetic material snaps into a cavity on the back side 211 of the motion sensor body 210 to form at least part of the socket 212.

In at least one embodiment, the curved rear-facing surface 212R of the socket 212 is shaped as a section of a sphere with a given diameter, and the distal end of the stem 222 is shaped as a section of a sphere with a diameter about the same as the given diameter. In another embodiment, the curved rear-facing surface 212R of the socket 212 is shaped as a section of a cylinder with a given diameter, and the distal end of the stem 222 is shaped as a section of a cylinder with a diameter about the same as the given diameter. The distal end of the stem 222 is positionable at a first location in the socket 212 to set the motion sensor body 210 at a first azimuth angle from the stem 222, and the distal end of the stem 222 is positionable at a second location in the socket 212 to set the motion sensor body 210 at a second azimuth angle from the stem 222.

Figure 3:
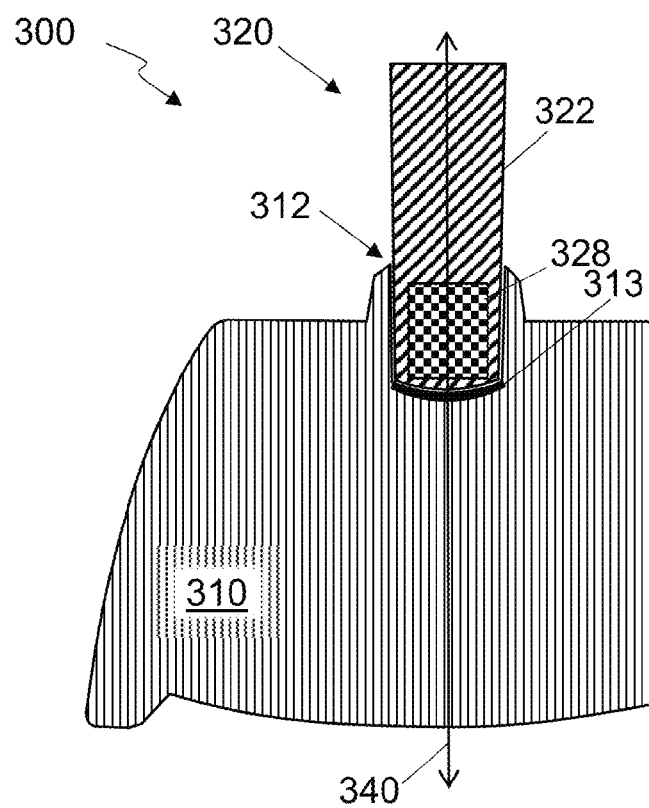
FIG. 3 shows a cross-sectional view of an embodiment of a security apparatus with fewer than two degrees of motion between the body and the mount.

FIG. 3 shows a cross-sectional view of an embodiment of a security apparatus 300 with fewer than two degrees of motion between the sensor body 310 and the mount 320. FIG. 3 may be used to represent a horizontal cross-sectional view of an embodiment of a security apparatus with a fixed elevation angle and a variable azimuth angle as shown in FIG. 2A-C. This can be referred to as one degree of freedom of movement. FIG. 3 may also be used to represent either a horizontal cross-sectional view or a vertical cross-sectional view of an embodiment of a security apparatus where both the elevation angle and the azimuth angle are fixed with respect to the mount. This can be referred to as zero degrees of freedom of movement. The security apparatus 300 includes a sensor body 310 with a socket 312 recessed into the sensor body 310 at an angle to a centerline 340 of the sensor body 310. In some embodiments, the angle between the angle of the socket 312 and the centerline 340 may be about 0° as is shown in FIG. 3 although other embodiments may have a different angle.

The security apparatus 300 includes a mount 320 with a stem 322 formed to fit into the socket 312. The shape of the socket 312 and the stem 322 can be any shape, depending on the embodiment, as long as the stem 322 can be inserted into the socket 312. In at least one embodiment, the socket 312 and the stem 322 are round and the sensor body 310 can rotate around the centerline of the stem 322. In other embodiments, the stem 322 and the socket 312 have 4 flat sides so that the sensor body 310 cannot rotate around the stem 322. In some embodiments, the shape of the stem 322 and socket 312 are substantially rectangular so that the stem 322 can be inserted into the socket 312 in only two different ways which may allow for selection between two different elevation angles for the sensor body 310. In other embodiments, the shape of the stem 322 and socket 312 are substantially square so that the stem 322 can be inserting into the socket 312 in four different ways. In at least one embodiment, the motion sensor body 310 is set to a substantially fixed position once the stem 322 is inserted into the socket 312 with an azimuth angle of about zero degrees from the stem 322.

The socket 312 includes a first magnetic material 313, the end of the stem 322 includes a second magnetic material 328, and the stem 322 is held in the socket 312 by magnetic force. In some embodiments, the first magnetic material 313 and the second magnetic material 328 are magnets oriented to attract one another. In other embodiments, the first magnetic material 313 is a ferromagnetic material such as steel, and the second magnetic material 328 is a magnet. Any type of magnet can be used, depending on the embodiment, but in at least one embodiment, the second magnetic material 328 is a neodymium magnet. The strength of the magnet may vary between embodiments depending on the mass of the sensor body 310, distance between the first magnetic material 313 and the second magnetic material 328, the type and size of the first magnetic material 313 and the second magnetic material 328, and the application. The magnet may be chosen to allow the stem 322 to be easily pulled from the socket 312 by a person, but to still have enough force to keep the stem 322 from being easily dislodged from the socket 312 if bumped or subjected to normal building vibrations. In at least one embodiment, the magnet used for the magnetic material 328 is chosen to exert about 2 pounds of force (about 10 Newtons) between the mount 320 and the sensor body 310.

Figure 4:
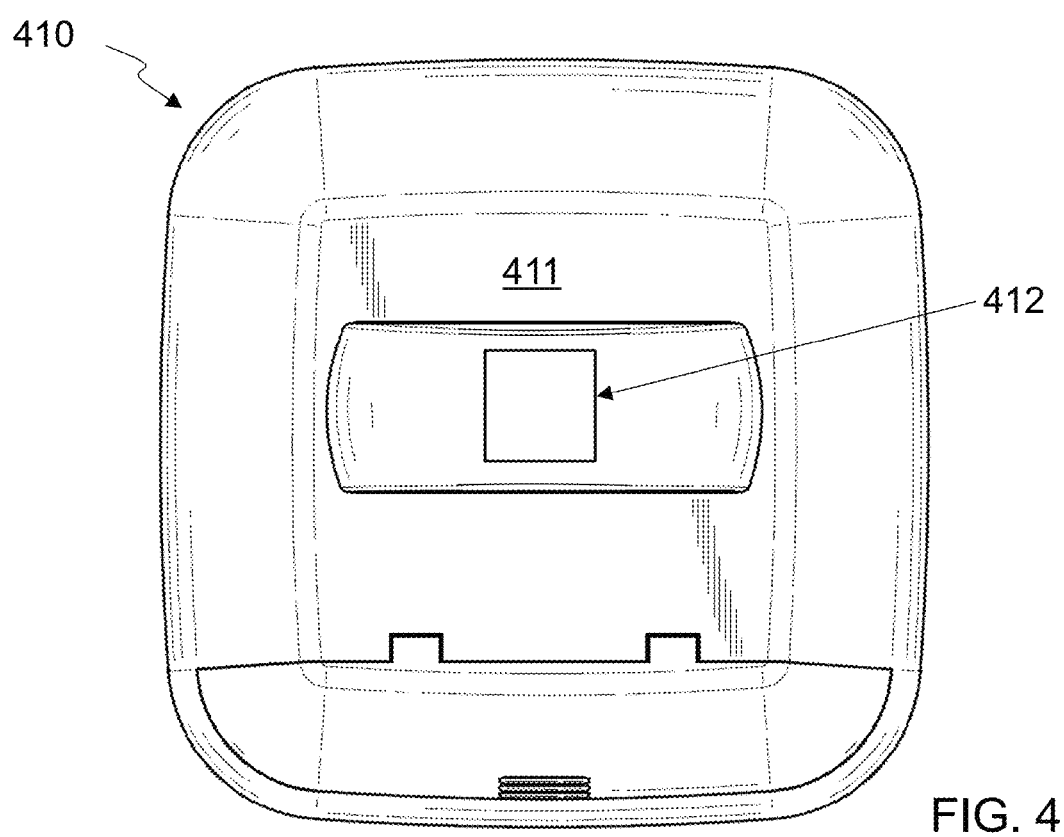
FIG. 4 shows a rear view of an embodiment of a sensor body of a security apparatus configured to have a fixed orientation with respect to its mount.

FIG. 4 shows a rear view of an embodiment of a sensor body 410 of a security apparatus configured to have a fixed orientation with respect to its mount. The sensor body 410 has a socket 412 recessed into a back side 411 of the sensor body 410. The socket 412 is formed to hold a stem of a mount by having 4 sides that fit in close proximity to the 4 sides of the stem so that the sensor body 410 is set to a substantially fixed position with respect to the mount when the stem is inserted into the socket 412. In at least one embodiment, the fixed position of the sensor body 410 has an elevation angle of about 0° and an azimuth angle of about 0° degrees with respect to the stem.

Figure 5A:
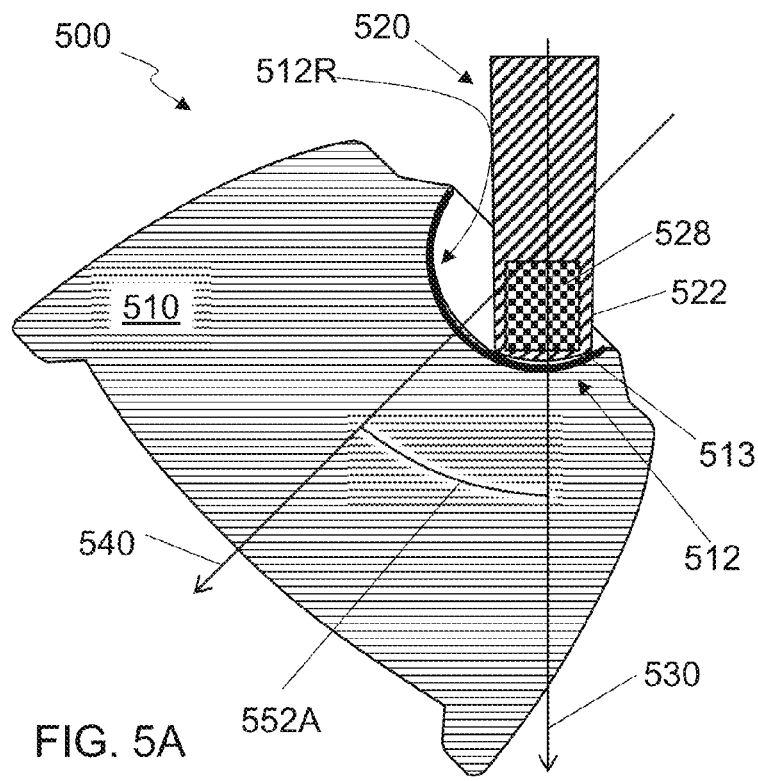
FIGS. 5A and 5B show cross-sectional views of an embodiment of a security apparatus set to two different angles.
Figure 5B:
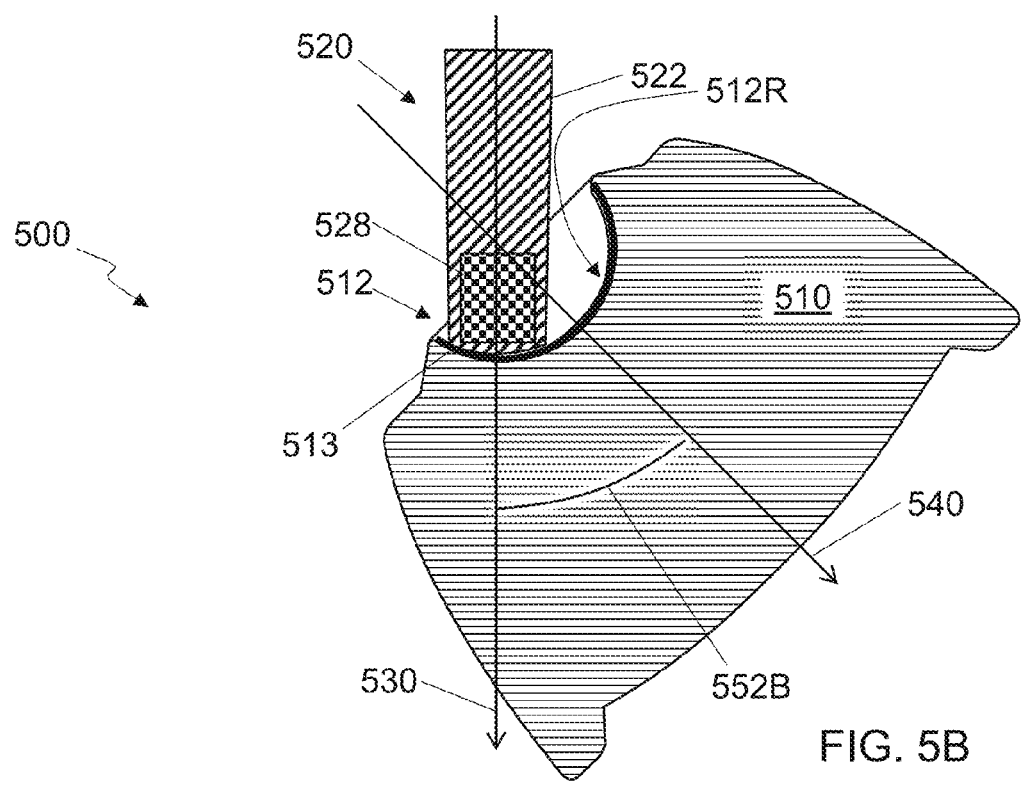

FIGS. 5A and 5B show cross-sectional views of an embodiment of a security apparatus 500 set to two different angles. Depending on the embodiment, FIG. 5A/B may represent vertical or horizontal cross-sectional views, but will be discussed as vertical cross-sectional views herein, so that FIG. 5A shows a first elevation angle 552A and FIG. 5B shows a second elevation angle 552B. The security apparatus 500 includes a sensor body 510 and a mount 520. The sensor body 510 includes a socket 512 recessed into back of the sensor body 510 with a concave rear-facing curved surface 512R. The shape of the concave rear-facing curved surface 512R may be a section of a cylinder with a given radius, a section of a sphere with a given radius, or some other shape, depending on the embodiment.

The mount 520 includes a stem 522 formed to fit into the socket 512. The shape of the end of the stem 522 may be a section of a cylinder with about the same radius as the cylinder used for the curved surface 512R of the socket 512, a section of a sphere with about the same radius as the sphere used for the curved surface 512R of the socket 512, or some other shape. The end of the stem 522 is variably positionable in the socket 512 to set the sensor body 510 at a plurality of elevation angles between a first elevation angle 552A and a second elevation angle 552B. The elevation angle 552A/B in at least some embodiments is measured between a centerline 530 of the stem 522 and a centerline 540 of a functional area of the sensor body 510. In at least one embodiment, the first elevation angle 552A is equal to about 45 degrees, and the second elevation angle 552B is equal to about −45 degrees.

The socket 512 includes a first magnetic material 513, the end of the stem 522 includes a second magnetic material 528, and the stem 522 is held in the socket 512 by magnetic force. In some embodiments, the first magnetic material 513 is a ferromagnetic material such as steel, and the second magnetic material 528 is a magnet. Any type of magnet can be used, depending on the embodiment, but in at least one embodiment, the second magnetic material 528 is a neodymium magnet. The strength of the magnet may vary between embodiments depending on the mass of the sensor body 510, distance between the first magnetic material 513 and the second magnetic material 528, the type and size of the first magnetic material 513 and the second magnetic material 528, and the application. The magnet may be chosen to allow the stem 522 to be easily moved within the socket 512 or pulled from the socket 512 by a person, but still have enough force to keep the stem 522 from being easily moved in the socket 512 if bumped or subjected to normal building vibrations. In at least one embodiment, the magnet used for the magnetic material 528 is chosen to exert about 5 pounds of force (about 20 Newtons) between the mount 520 and the sensor body 510.

Some embodiments may include an alignment mechanism to encourage the location of the stem 522 at specific locations within the socket 512. In some embodiments, the end of the stem 522 may include an indentation to engage with a plurality of with protrusions located at specific places in the socket 512, and in other embodiments, the end of the stem 522 may include a protrusion to engage with a plurality of indentations on the socket 512. In at least one embodiment, the socket 512 includes at least one indentation shaped to accept the end of the stem 522 to provide one or more pre-defined orientations of the sensor body. Other embodiments may include other types of alignment mechanisms.

Figure 6A:
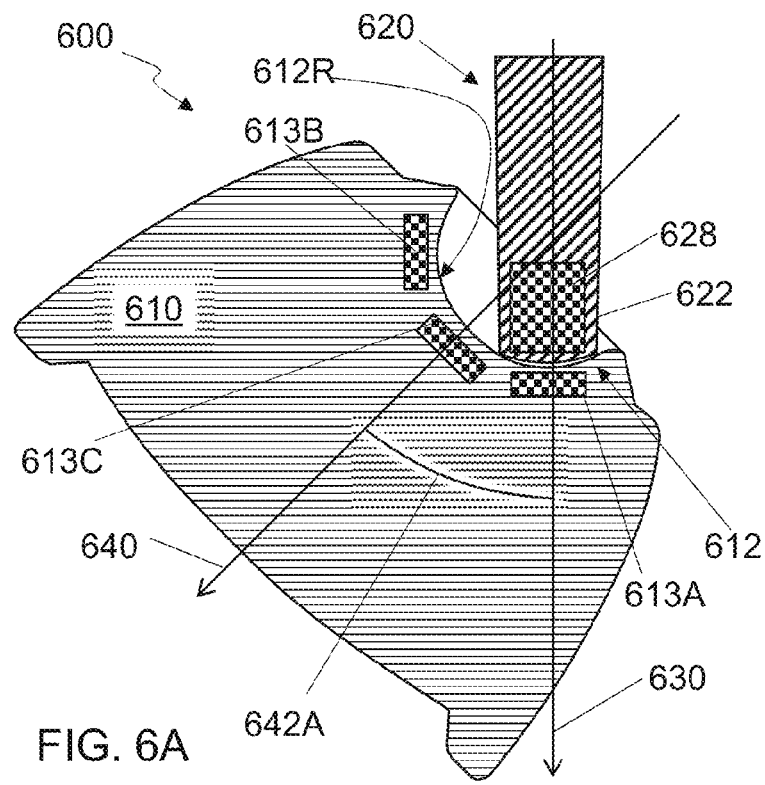
FIGS. 6A and 6B show cross-sectional views of an alternative embodiment of a security apparatus set to two different angles.
Figure 6B:
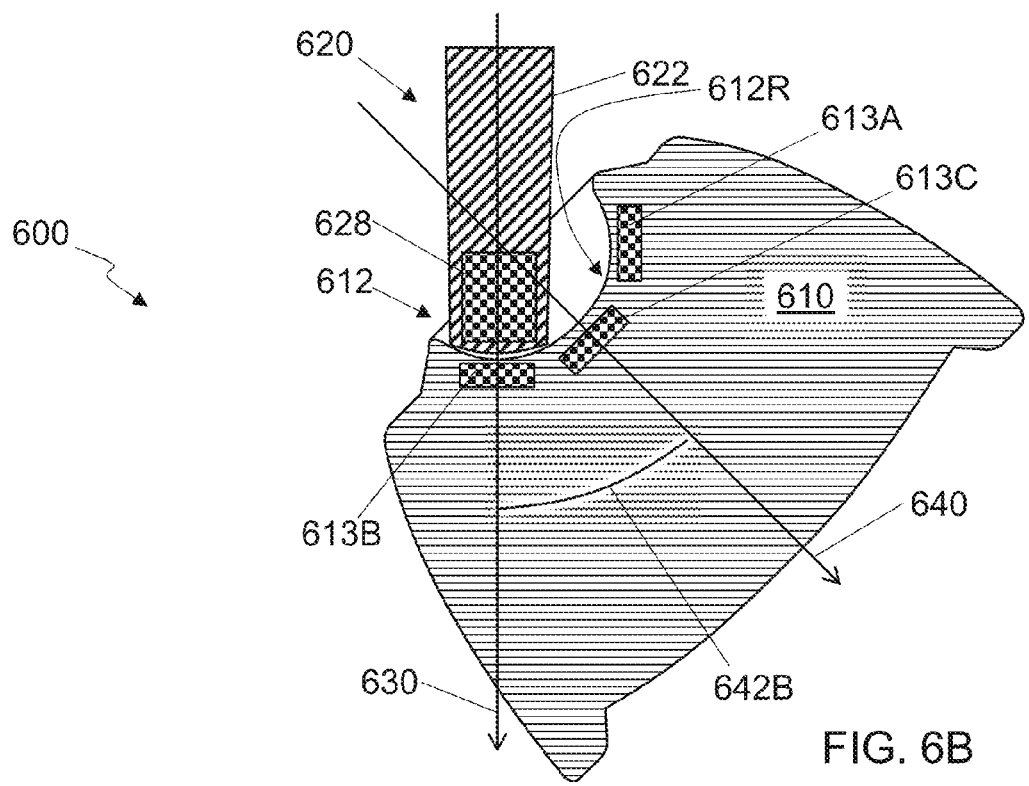

FIGS. 6A and 6B show cross-sectional views of an alternative embodiment of a security apparatus 600 set to two different angles. Depending on the embodiment, FIG. 6A/B may represent vertical or horizontal cross-sectional views but will be discussed as horizontal cross-sectional views herein, so that FIG. 6A shows a first azimuth angle 642A and FIG. 6B shows a second azimuth angle 642B. The security apparatus 600 includes a sensor body 610 and a mount 620. The sensor body 610 includes a socket 612 recessed into back of the sensor body 610 with a concave rear-facing curved surface 612R. In the embodiment shown, the socket 612 includes two or more magnets placed near the socket 612 with a magnetic pole facing into the socket.

The mount 620 includes a stem 622 formed to fit into the socket 612. The end of the stem 622 is variably positionable in the socket 612 to set the sensor body 610 at a plurality of azimuth angles. The end of the stem 622 includes a magnetic material 628 which in some embodiments is a magnet with an opposite magnetic pole facing the end of the stem 622. The azimuth angle 642A/B in at least some embodiments is measured between a centerline 630 of the stem 622 and a centerline 640 of a functional area of the sensor body 610.

The security apparatus 600 includes a first alignment mechanism to position the end of the stem 622 at a first location in the socket 612 to set the sensor body 610 to a first azimuth angle 642A of about 45 degrees The first alignment mechanism includes a first magnet 613A near the first location in the socket 612 to attract the magnetic material 628 in the stem.

The security apparatus 600 includes a second alignment mechanism to position the end of the stem 622 at a second location in the socket 612 to set the sensor body 610 to a second azimuth angle 642B of about −45 degrees. The second alignment mechanism includes a second magnet 613B near the second location in the socket 612 to attract the magnetic material 628 in the stem.

The security apparatus 600 includes a third alignment mechanism to position the end of the stem 622 at a third location in the socket 612 to set the sensor body 610 to a third azimuth angle of about 0 degrees The third alignment mechanism includes a third magnet 613C near the third location in the socket 612 to attract the magnetic material 628 in the stem.

In at least one embodiment, the magnetic material 628 includes a magnet with its north pole facing the socket. In those embodiments, the first magnet 613A is placed near the socket 612 with its south pole facing into the socket 612, the second magnet 613B is placed near the socket 612 with its south pole facing into the socket 612, and the third magnet 613C is placed near the socket 612 with its south pole facing into the socket 612

Figure 7A:
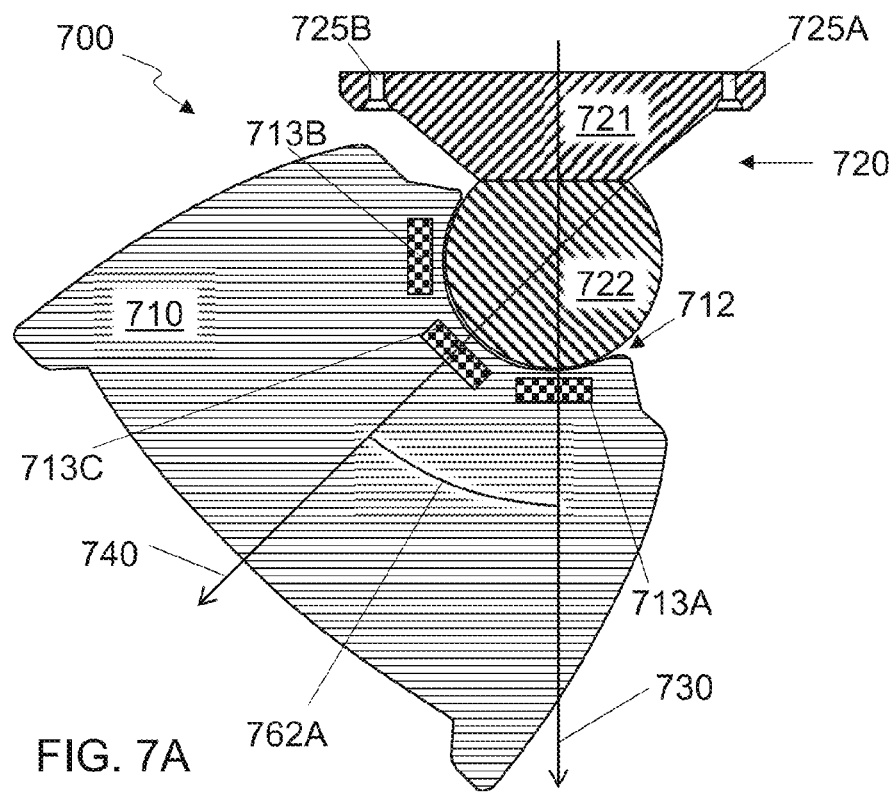
FIGS. 7A and 7B show cross-sectional views of yet another alternative embodiment of a security apparatus set to two different orientations.
Figure 7B:
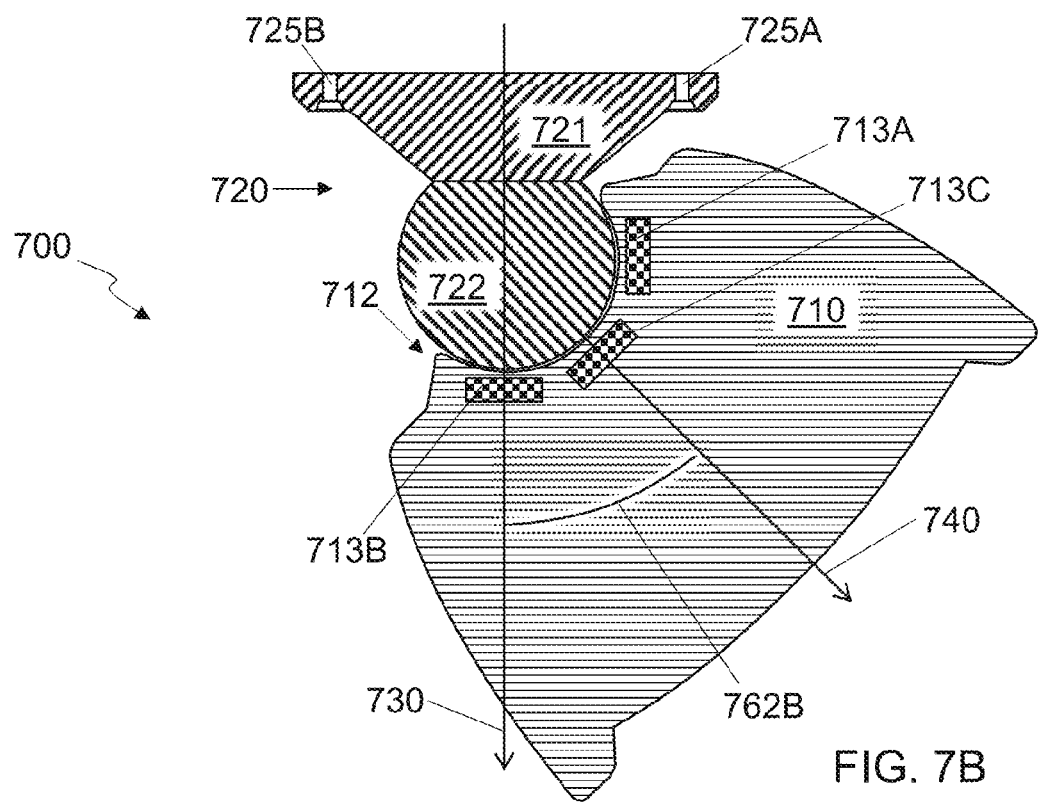

FIGS. 7A and 7B show cross-sectional views of yet another alternative embodiment of a security apparatus 700 set to two different orientations. Depending on the embodiment, FIG. 7A/B may represent vertical or horizontal cross-sectional views or a cross-sectional view in some other plane, so the angles 762A/B discussed could represent azimuth angles, elevation angles, or some other orientation between the centerline 730 of the stem 722 and the centerline 740 of the body 710. An orientation can be represented as a combination of a particular azimuth angle at a particular elevation angle. The body 710 includes a socket 712 that includes a first magnetic material. In some embodiments, the magnetic material may include one or more magnets 713A-C.

The mount 720 includes a base 721 and a stem 722 that includes a second magnetic material and is formed to fit into the socket 712. The base 721 is adapted to be attached to a surface. In some embodiments, screw holes 725A/B may be used to attach the base 721 to the surface, but other embodiments may use other attachment mechanisms. The stem 722 is variably positionable in the socket 712 to set the body 710 at a plurality of orientations (a plurality of azimuth angles and a plurality of elevation angles), a plurality of azimuth angles or a plurality of elevation angles with respect to the mount 720. The second magnetic material in the stem 722 may be a ferromagnetic material such as steel in some embodiments. In at least one embodiment, the stem 722 is constructed from steel. When the stem 722 is inserted into the socket 712, the body 710 is held in place by magnetic attraction between the first magnetic material and the second magnetic material.

In the embodiment shown, the socket 712 has a concave curved surface shaped as a section of a sphere with a given diameter and an end of the stem 722 is shaped as a section of a sphere with a diameter that is about the same to a little bit smaller than given diameter. In some embodiments, the end of the stem 722 has a surface area at least as large as a surface area of the concave curved surface of the socket 712 and may be at least a hemisphere in size or larger. In some embodiments, the entire stem 722 may constitute the end of the stem 722 and be shaped as a section of a sphere.

FIG. 7A shows the stem 722 inserted into the socket 712 at a first position to create a first orientation 762A for the body 710. The first orientation 762A can be represented as a first elevation angle and a first azimuth angle. FIG. 7B shows the stem 722 inserted into the socket 712 at a second position to create a second orientation 762B for the body 710. The second orientation 762B can be represented as a second elevation angle and a second azimuth angle.

Figure 8:
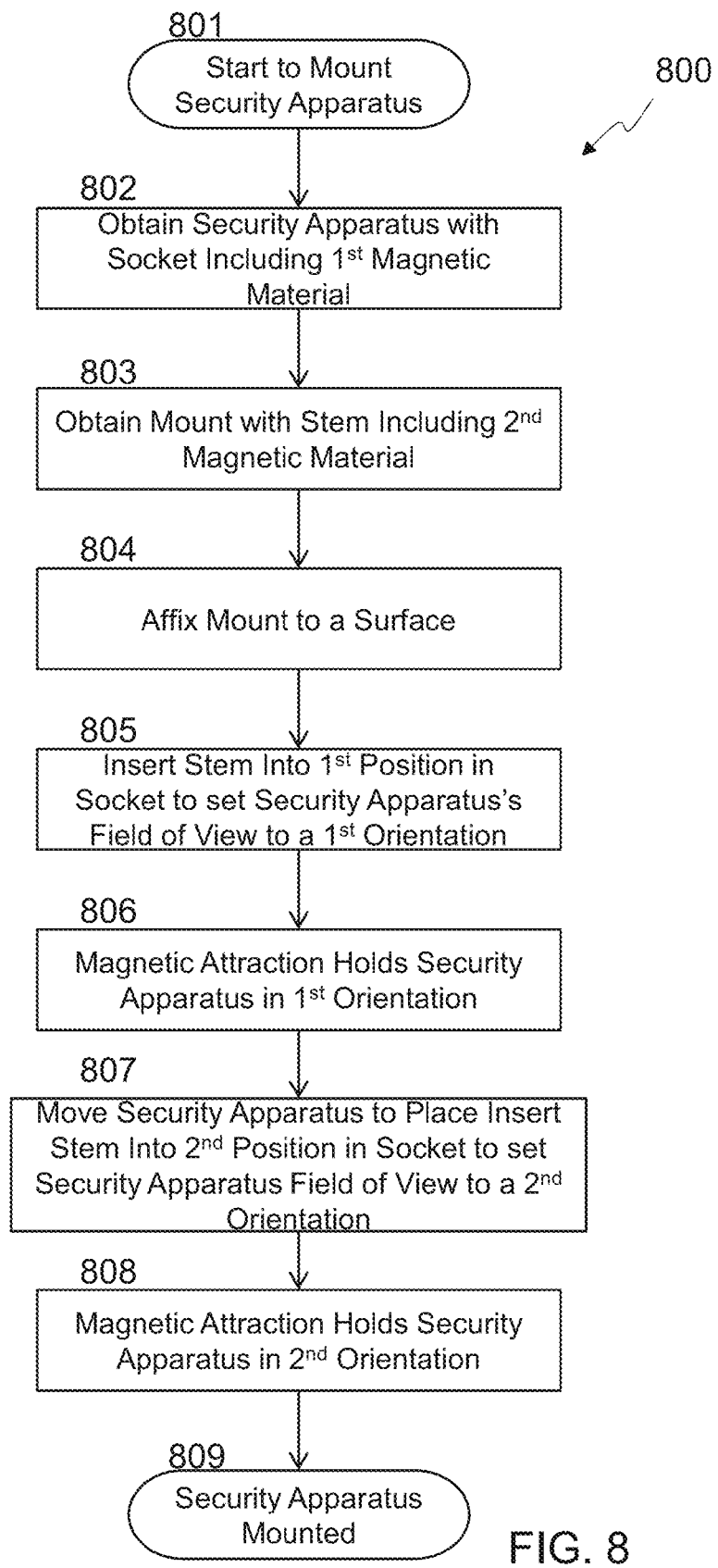
FIG. 8 shows a flowchart of an embodiment of a method of mounting a security apparatus.

FIG. 8 shows a flowchart 800 of an embodiment of a method of mounting a security apparatus. The security apparatus may be a camera, a motion sensor, or any other type of security apparatus. The method starts to mount the security apparatus at block 801 and a security apparatus body having a field of view is obtained at block 802. The security apparatus includes a socket that includes a concave curved surface with a first magnetic material. The flowchart 800 continues at block 803 with obtaining a mount having a second magnetic material. At block 804 the mount is affixed to a surface, such as a wall, a ceiling, a post, or any other type of surface that allows the security apparatus to be positioned as desired. The stem is inserted into the socket at a first position at block 805 to set the field of view of the security apparatus body to a first orientation. Magnetic attraction between the first magnetic material and the second magnetic material holds the security apparatus body in the first orientation at block 806.

In some embodiments, the method also includes changing the orientation of the security apparatus. In such embodiments, the flowchart 800 includes optional block 807 to move the security apparatus body to place the stem into the socket at a second position to set the field of view of the security apparatus body to a second orientation, and the security apparatus is held in the second orientation by magnetic attraction between the first magnetic material and the second magnetic material at optional block 808. The method concludes at block 809.

Examples of various embodiments are described in the following paragraphs:

An example camera includes a camera body having a field of view and comprising a socket that includes a concave curved surface comprising a first magnetic material and a mount comprising a base and a stem attached to the base, the base adapted to be affixed to a surface, and an end of the stem comprising a second magnetic material and formed to fit into the socket. In the example camera, with the stem of the mount inserted into the socket and the camera body held in place by magnetic attraction between the first magnetic material and the second magnetic material, the field of view of the camera body is set to a first orientation if the stem is inserted into the socket at a first position, and the field of view of the camera body is set to a second orientation if the stem is inserted into the socket at a second position. In some example cameras with the stem of the mount inserted into the socket and held in place by magnetic attraction between the first magnetic material and the second magnetic material, the field of view of the camera body is set to a third orientation if the stem is inserted into the socket at a third position. In some example cameras the field of view of the camera body varies with at least two degrees of freedom between the first orientation, the second orientation, and the third orientation. In some example cameras the first orientation comprises a first azimuth angle and a first elevation angle, and the second orientation comprises a second azimuth angel and a second elevation angle. In some example cameras the concave curved surface of the socket is shaped as a section of a sphere with a given diameter, and the end of the stem is shaped as a section of a sphere with a diameter between about 100% and about 90% of the given diameter. In some example cameras the end of the stem has a surface area at least as large as a surface area of the concave curved surface of the socket. In some example cameras the first magnetic material comprises one or more magnets, and the second magnetic material In some example cameras the first magnetic material comprises steel shaped to form the concave curved surface of the socket, and the second magnetic material comprises a magnet. In some example cameras the end of the stem has a surface area of less than half of a surface area of the concave curved surface of the socket. In some example cameras the end of the stem is a distal end, a proximal end of the stem is attached to the base, and the stem has four substantially flat sides tapered from the proximal end to the distal end. Some example cameras also include a high friction surface on at least one of the end of the stem or the concave curved surface of the socket. In some example cameras the high friction surface includes a textured surface, a high friction coating, or a textured coating. Any combination of elements described in this paragraph may be used in various embodiments.

An example method of mounting a security apparatus includes obtaining a security apparatus body having a field of view and comprising a socket that includes a concave curved surface comprising a first magnetic material, obtaining a mount having a stem comprising a second magnetic material, affixing the mount to a surface, and inserting the stem into the socket at a first position to set the field of view of the security apparatus body to a first orientation. In the example method the security apparatus body is held in the first orientation by magnetic attraction between the first magnetic material and the second magnetic material. Some example methods also include moving the security apparatus body to place the stem into the socket at a second position to set the field of view of the security apparatus body to a second orientation. In some example methods, the security apparatus body is held in the second orientation by magnetic attraction between the first magnetic material and the second magnetic material. The security apparatus may be a camera, a motion sensor, or any other type of security apparatus. Any combination of elements described in this paragraph may be used in various embodiments.

An example security apparatus includes a body comprising a socket that includes a first magnetic material, and a mount comprising a stem that is formed to fit into the socket and includes a second magnetic material. In the example security apparatus, if the stem is inserted into the socket, the body is held in place by magnetic attraction between the first magnetic material and the second magnetic material. In some example security apparatuses, the body is set to a substantially fixed position with respect to the mount when the stem is inserted into the socket. In some example security apparatuses, the stem is variably positionable in the socket to set the body at a plurality of azimuth angles or a plurality of elevation angles with respect to the mount. In some example security apparatuses, the stem is variably positionable in the socket to set the body at a plurality of azimuth angles and a plurality of elevation angles with respect to the mount. In some example security apparatuses, the plurality of azimuth angles include azimuth angles of about 45 degrees and about −45 degrees and the plurality of elevation angles includes elevation angles of about 0 degrees and about −30 degrees. Some example security apparatuses also include a first magnet positioned in the stem with a first magnetic pole facing away from the mount, a second magnet placed in a first location in the socket with a magnetic pole opposite of the first magnetic pole facing into the socket, and a third magnet placed in a second location in the socket with a magnetic pole opposite of the first magnetic pole facing into the socket. In some example security apparatuses, if the stem is inserted into the socket with the first magnet in close proximity to the second magnet, the body is positioned at a first orientation with respect to the mount, and if the stem is inserted into the socket with the first magnet in close proximity to the third magnet, the body is positioned at a second orientation with respect to the mount. In some example security apparatuses, the first magnetic material comprises steel, and the second magnetic material comprises a magnet. In some example security apparatuses, the steel magnetic material snaps into a cavity on the back of the body to form at least a part of the socket. In some example security apparatuses, the socket comprises a concave curved surface shaped as a section of a sphere with a given diameter, and an end of the stem is shaped as a section of a sphere with a diameter between about 100% and about 90% of the given diameter. In some example security apparatuses, the end of the stem has a surface area at least as large as a surface area of the concave curved surface of the socket. In some example security apparatuses, the end of the stem comprises at least a hemisphere. In some example security apparatuses, the socket comprises a concave curved surface and an end of the stem has a surface area of less than half of a surface area of the concave curved surface of the socket. In some example security apparatuses, the socket comprises a concave curved surface and the mount comprises a base attached to a proximal end of the stem and adapted to be attached to a surface. In some example security apparatuses, a distal end of the stem is formed to fit in the socket and the distal end of the stem has a surface area of less than half of a surface area of the concave curved surface of the socket, and the stem extends from the base and has four substantially flat sides tapered from the proximal end to the distal end. Some example security apparatuses also include a high friction surface on at least one of the end of the stem or the concave rear surface of the socket. In some example security apparatuses, the high friction surface includes a textured surface, a high friction coating, or a textured coating. Any combination of elements described in this paragraph may be used in various embodiments.

As used in this specification and the appended claims, the singular forms "a", "an", and "the" include plural referents unless the content clearly dictates otherwise. Thus, for example, reference to an element described as "a monitored volume" may refer to a single monitored volume, two monitored volumes, or any other number of monitored volumes. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±5% of the modified quantity, measurement, or distance. The recitation of numerical ranges by endpoints includes all numbers subsumed within that range (e.g. 1 to 5 includes 1, 2.78, 3.33, and 5). Any element in a claim that does not explicitly state "means for" performing a specified function, or "step for" performing a specified function, is not to be interpreted as a "means" or "step" clause as specified in 35 U.S.C. §112(f).

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. A security apparatus comprising:
a body comprising a socket that includes a first magnetic material;
a mount comprising a stem that is formed to fit into the socket and includes a second magnetic material;
the first magnetic material comprising a first magnet positioned in the stem with a first magnetic pole facing away from the mount; and
the second magnetic material comprising a second magnet placed in a first location in the socket with a magnetic pole opposite of the first magnetic pole facing into the socket, and a third magnet placed in a second location in the socket with a magnetic pole opposite of the first magnetic pole facing into the socket;
wherein if the stem is inserted into the socket with the first magnet in close proximity to the second magnet, the body is positioned at a first orientation with respect to the mount, and if the stem is inserted into the socket with the first magnet in close proximity to the third magnet, the body is positioned at a second orientation with respect to the mount;
wherein the body is held in place on the mount by magnetic attraction between the first magnetic material and the second magnetic material once the stem is inserted into the socket; and
wherein the stem is variably positionable in the socket to set the body at a plurality of azimuth angles with respect to the mount.

2. The security apparatus of claim 1, wherein the plurality of azimuth angles include azimuth angles of about 45 degrees, about 0 degrees, and about −45 degrees.

3. The security apparatus of claim 1, wherein the security apparatus comprises a motion sensor.

4. The security apparatus of claim 1, wherein the stem is variably positionable in the socket to set the body at a plurality of elevation angles with respect to the mount.

5. The security apparatus of claim 4, wherein the plurality of azimuth angles include azimuth angles of about 45 degrees and about −45 degrees and the plurality of elevation angles includes elevation angles of about 0 degrees and about −30 degrees.

6. The security apparatus of claim 4, wherein the security apparatus comprises a camera.

7. The security apparatus of claim 1, wherein the socket comprises a concave curved surface shaped as a section of a sphere with a given diameter, and an end of the stem is shaped as a section of a sphere with a diameter between about 100% and about 90% of the given diameter.

8. The security apparatus of claim 7, wherein the end of the stem has a surface area at least as large as a surface area of the concave curved surface of the socket.

9. The security apparatus of claim 7, wherein the end of the stem comprises at least a hemisphere.

10. The security apparatus of claim 1, wherein the socket comprises a concave curved surface and an end of the stem has a surface area of less than half of a surface area of the concave curved surface of the socket.

11. The security apparatus of claim 1, further comprising a high friction surface on the distal end of the stem or the concave curved surface of the socket.

12. The security apparatus of claim 11, the high friction surface comprising a textured surface, a high friction coating, or a textured coating.

13. A security apparatus comprising:
a body comprising a socket, the socket comprising a first magnetic material, a concave curved surface, a first wall, and a second wall opposite from the first wall; and
a mount comprising a base and a stem;
the base attached to a proximal end of the stem and adapted to be attached to a surface; and
the stem formed to fit into the socket and comprising a distal end that includes a second magnetic material, and four substantially flat sides extending from the base and tapered from the proximal end to the distal end, wherein the stem is formed to fit into the socket in close proximity to the concave curved surface, the first wall, and the second wall of the socket, and the distal end of the stem has a surface area of less than half of a surface area of the concave curved surface of the socket;
wherein the body is held in place on the mount by magnetic attraction between the first magnetic material and the second magnetic material once the distal end of the stem is inserted into the socket; and wherein the stem is variably positionable in the socket to set the body at a plurality of azimuth angles with respect to the mount.

14. The security apparatus of claim 13, further comprising a high friction surface on the distal end of the stem or the concave curved surface of the socket.

15. The security apparatus of claim 14, the high friction surface comprising a textured surface, a high friction coating, or a textured coating.

16. The security apparatus of claim 13, wherein the plurality of azimuth angles include azimuth angles of about 45 degrees, about 0 degrees, and about −45 degrees.

17. The security apparatus of claim 13, wherein the body comprises a motion sensor.

18. The security apparatus of claim 13, the second magnetic material comprising a first magnet positioned with a first magnetic pole facing away from the mount; and
the first magnetic material comprising a second magnet placed in a first location in the socket with a magnetic pole opposite of the first magnetic pole facing into the socket, and a third magnet placed in a second location in the socket with a magnetic pole opposite of the first magnetic pole facing into the socket;
wherein if the stem is inserted into the socket with the first magnet in close proximity to the second magnet, the body is positioned at a first azimuth angle with respect to the mount; and
if the stem is inserted into the socket with the first magnet in close proximity to the third magnet, the body is positioned at a second azimuth angle with respect to the mount.

19. A security apparatus comprising:
a body comprising a socket that includes a first magnet placed at a first location in the socket with a first magnetic pole facing into the socket, and a second magnet placed at a second location in the socket with a magnetic pole that is the same as the first magnetic pole facing into the socket;
a mount comprising a stem that is formed to fit into the socket and includes a third magnet positioned in the stem with a magnetic pole opposite of the first magnetic pole facing away from the mount;
wherein if the stem is inserted into the socket with the first magnet in close proximity to the third magnet, the body is positioned at a first orientation with respect to the mount and the body is held in place on the mount by a magnetic attraction between the first magnet and the third magnet, and
if the stem is inserted into the socket with the second magnet in close proximity to the third magnet, the body is positioned at a second orientation with respect to the mount and the body is held in place on the mount by a magnetic attraction between the second magnet and the third magnet.

20. The security apparatus of claim 19, wherein the first orientation has a first elevation angle and a first azimuth angle, and the second orientation has a second elevation angle and a second azimuth angle, and the first elevation angle is different than the second elevation angle.

* * * * *